US012585735B2

(12) United States Patent
Mathur et al.

(10) Patent No.: US 12,585,735 B2
(45) Date of Patent: Mar. 24, 2026

(54) SYSTEMS AND METHODS FOR GENERATING AND DISTRIBUTING NFTs BASED ON USER INTERACTION

(71) Applicant: Comcast Cable Communications, LLC, Philadelphia, PA (US)

(72) Inventors: Arpit Mathur, Pittsburgh, PA (US); Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 66 days.

(21) Appl. No.: 18/497,468

(22) Filed: Oct. 30, 2023

(65) Prior Publication Data

US 2025/0139206 A1    May 1, 2025

(51) Int. Cl.
| | |
|---|---|
| *G06F 21/00* | (2013.01) |
| *G06F 3/01* | (2006.01) |
| *G06F 21/10* | (2013.01) |
| *G06V 40/20* | (2022.01) |
| *H04L 9/00* | (2022.01) |

(52) U.S. Cl.
CPC .......... *G06F 21/1015* (2023.08); *G06F 3/013* (2013.01); *G06V 40/20* (2022.01); *H04L 9/50* (2022.05)

(58) Field of Classification Search
CPC ....... H04L 9/50; G06V 40/20; G06F 21/1015; G06F 3/013
See application file for complete search history.

(56) References Cited

U.S. PATENT DOCUMENTS

| | | | |
|---|---|---|---|
| 2020/0104999 A1* | 4/2020 | Edell .................... | G06V 40/161 |
| 2022/0069996 A1 | 3/2022 | Xue et al. | |
| 2023/0004625 A1* | 1/2023 | Khan ....................... | G06F 21/10 |
| 2023/0138023 A1* | 5/2023 | Yang .................... | A63F 13/792 |
| | | | 463/42 |
| 2024/0307783 A1* | 9/2024 | Menapace ............... | A63F 13/67 |
| 2024/0422291 A1* | 12/2024 | Ramde .................. | H04N 7/155 |
| 2025/0039503 A1* | 1/2025 | Murugan ......... | H04N 21/44218 |

FOREIGN PATENT DOCUMENTS

WO        2023003996 A1      1/2023

OTHER PUBLICATIONS

Debut Infotech. (Aug. 21, 2023). Fractional NFTs: A new era of shared digital ownership. Debut Infotech. https://www.debutinfotech.com/blog/fractional-nfts-a-new-era-of-shared-digital-ownership (Year: 2023).*

* cited by examiner

*Primary Examiner* — Don G Zhao
(74) *Attorney, Agent, or Firm* — Banner & Witcoff, Ltd.

(57)        ABSTRACT

Methods are described for awarding non-fungible tokens (NFTs) and shared NFTs to members of a group participating and interacting with content provided on one or more devices. The NFTs may be generated, awarded, and assigned based on the engagement of the individual members of the group and the collective engagement of the group with the content.

20 Claims, 14 Drawing Sheets

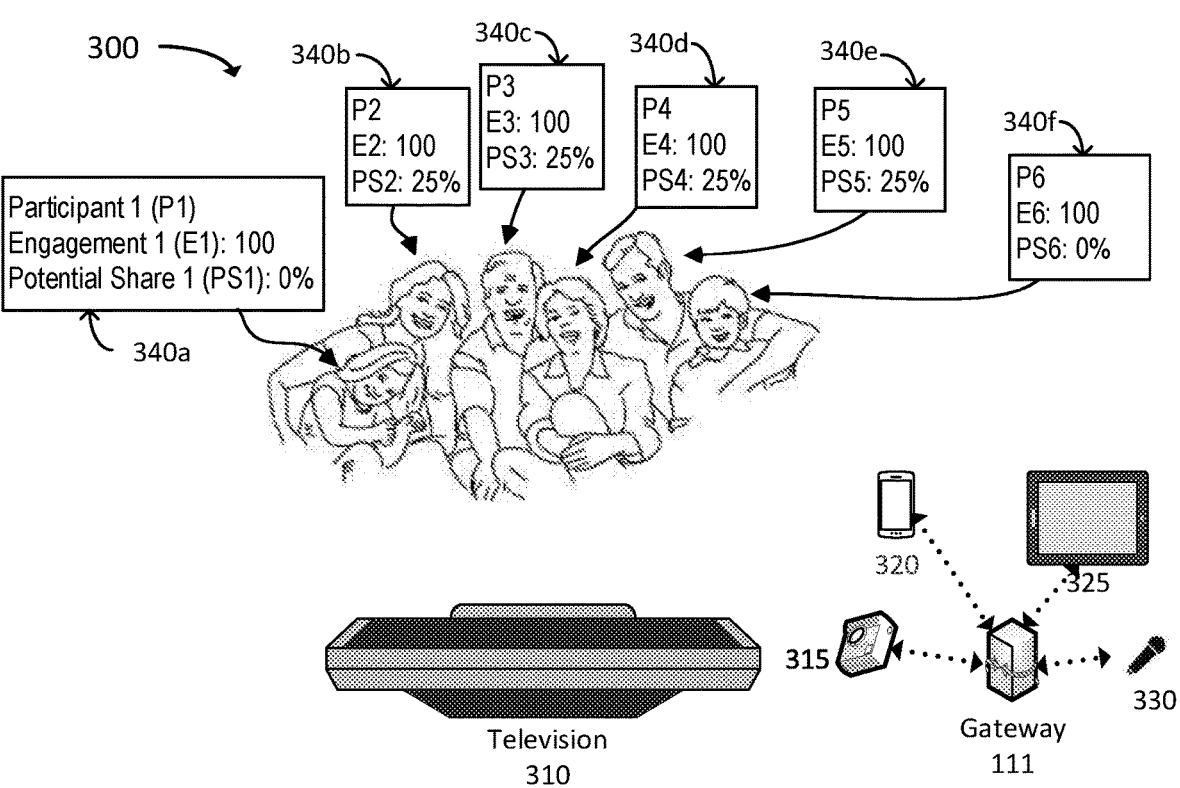

300

340b

P2
E2: 100
PS2: 25%

340c
P3
E3: 100
PS3: 25%

340d
P4
E4: 100
PS4: 25%

340e
P5
E5: 100
PS5: 25%

340f
P6
E6: 100
PS6: 0%

Participant 1 (P1)
Engagement 1 (E1): 100
Potential Share 1 (PS1): 0%

340a

320

325

315

330

Television
310

Gateway
111

Detection:

Video data at location 1, where there are five participants.

Determination of engagement:

The five participants are focused on the content and smiling, one is cheering, and two are children.

All the individuals are equally engaged based on the focus on the content.

Potential ownership of NFT:

The two children are not potential owners of the NFT, and each adult is a potential equal partial owner based on their equal engagement.

FIG. 3A

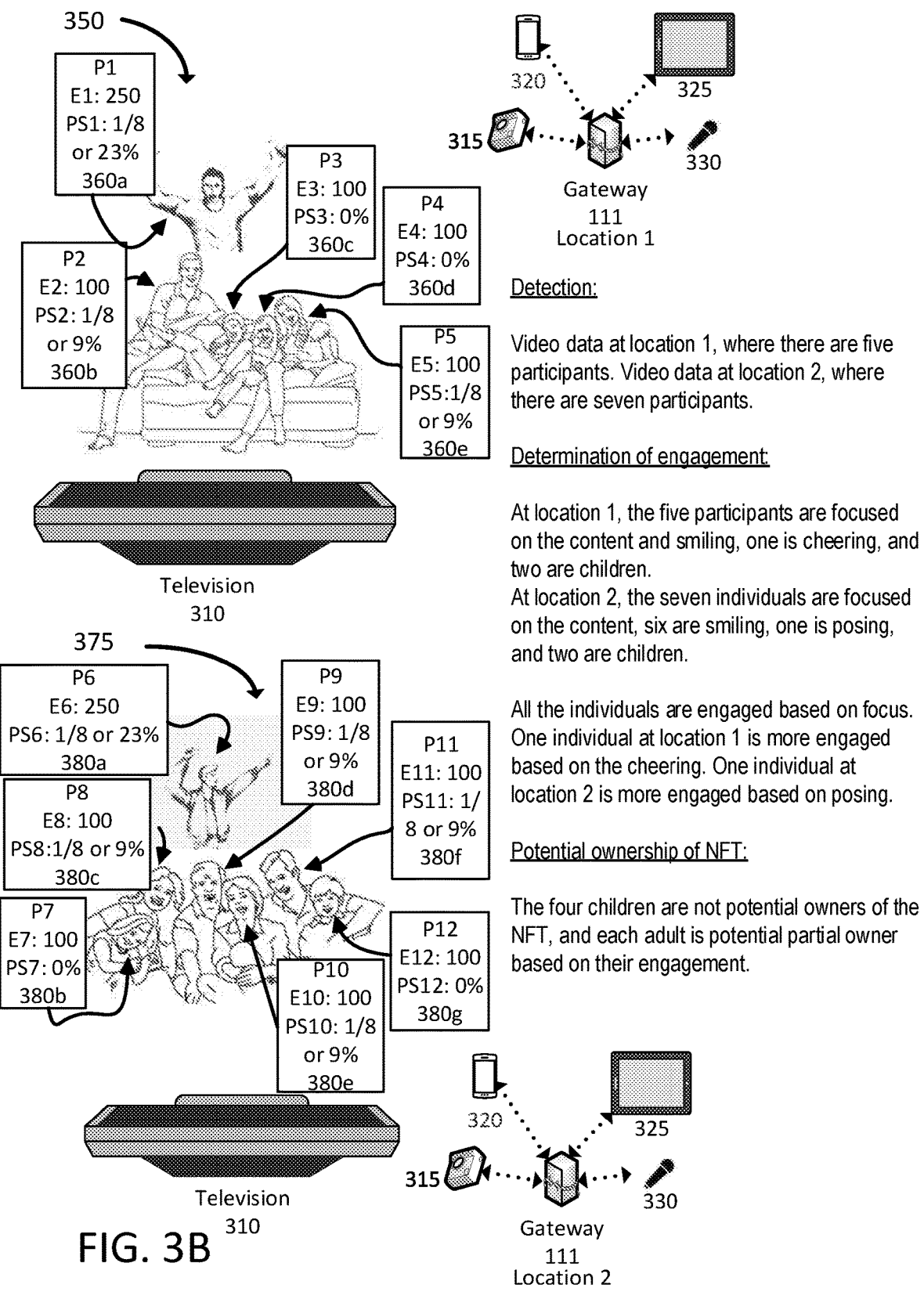

350

P1
E1: 250
PS1: 1/8
or 23%
360a

P3
E3: 100
PS3: 0%
360c

P4
E4: 100
PS4: 0%
360d

P2
E2: 100
PS2: 1/8
or 9%
360b

P5
E5: 100
PS5:1/8
or 9%
360e

Television
310

320
325
315
330
Gateway
111
Location 1

Detection:

Video data at location 1, where there are five participants. Video data at location 2, where there are seven participants.

Determination of engagement:

At location 1, the five participants are focused on the content and smiling, one is cheering, and two are children.
At location 2, the seven individuals are focused on the content, six are smiling, one is posing, and two are children.

All the individuals are engaged based on focus. One individual at location 1 is more engaged based on the cheering. One individual at location 2 is more engaged based on posing.

Potential ownership of NFT:

The four children are not potential owners of the NFT, and each adult is potential partial owner based on their engagement.

375

P6
E6: 250
PS6: 1/8 or 23%
380a

P9
E9: 100
PS9: 1/8
or 9%
380d

P11
E11: 100
PS11: 1/
8 or 9%
380f

P8
E8: 100
PS8:1/8 or 9%
380c

P7
E7: 100
PS7: 0%
380b

P12
E12: 100
PS12: 0%
380g

P10
E10: 100
PS10: 1/8
or 9%
380e

Television
310

320
325
315
330
Gateway
111
Location 2

| Engagement Award | Description | Engagement Value |
|---|---|---|
| Attention | Focused on screen | 5 |
| Follow through | Go to a link provided | 10 |
| Cheers | A cheer reaction at a particular moment (e.g., escaping a dinosaur, the raptors take on the t-rex) | 10 |
| Group gasp/sigh/surprise | An indication by a majority of the group of surprise at a particular moment (e.g., when a character gives away their location or when the t-rex first appears) | 10 |
| Jump scare/shock | An indication of momentary fear or surprise (e.g., when the t-rex or raptors suddenly appear) | 15 |
| . | | |

| Engagement Award | Description | Engagement Value |
|---|---|---|
| Kill | Kill an opponent | 5 |
| Head shot | Kill an opponent with a headshot | 10 |
| Dance on the dead | Kill an opponent and dance on their corpse | 10 |
| Root for your team | Cheer on your teammates | 15 |
| Team dance | All team members dance | 20 |
| Team player | Sacrifice yourself for the group | 20 |
| Victory | Team wins | 25 |
| Super victory | Team wins with less than 5 deaths | 30 |
| Masters of the field | Team wins with no deaths | 50 |
| ... | ... | ... |

422a → Minimum individual engagement required for NFT award (individual or multi-sig) – 75

422b → Minimum group engagement required for shared NFT award - 300

| NFT for watching content on display device | Rarity | Individual threshold value | Group threshold value | Individual or multi-sig award |
|---|---|---|---|---|
| Super viewer(s) (Viewer(s) image with Jurassic Park logo) | Common | 75 | 75 * Number of viewers participants | Individual and multi-sig |
| A grand party (a video montage of viewer reactions) | Uncommon | 80 | 1000 with more than 10 viewers | Shared |
| Jump Scare (a video of the reaction to the jump scare moment) | Rare | 100 (highest viewer score of all during jump scare moment) | 300 | Individual for any viewers above 100 or multi-sig awarded share among all viewers with scores greater than 100 |
| Multi watch party (a running tally of the number of times the group has watched JP, a video montage of the viewers during the multiple watching) | Rare | 120 | 500 | Shared |
| The marathon (watching JP and sequels) | Very rare | 150 | 1000 | Shared |
| ... | ... | ... | ... | ... |
| 424 | 426 | 428 | 430 | 432 |

FIG. 4C

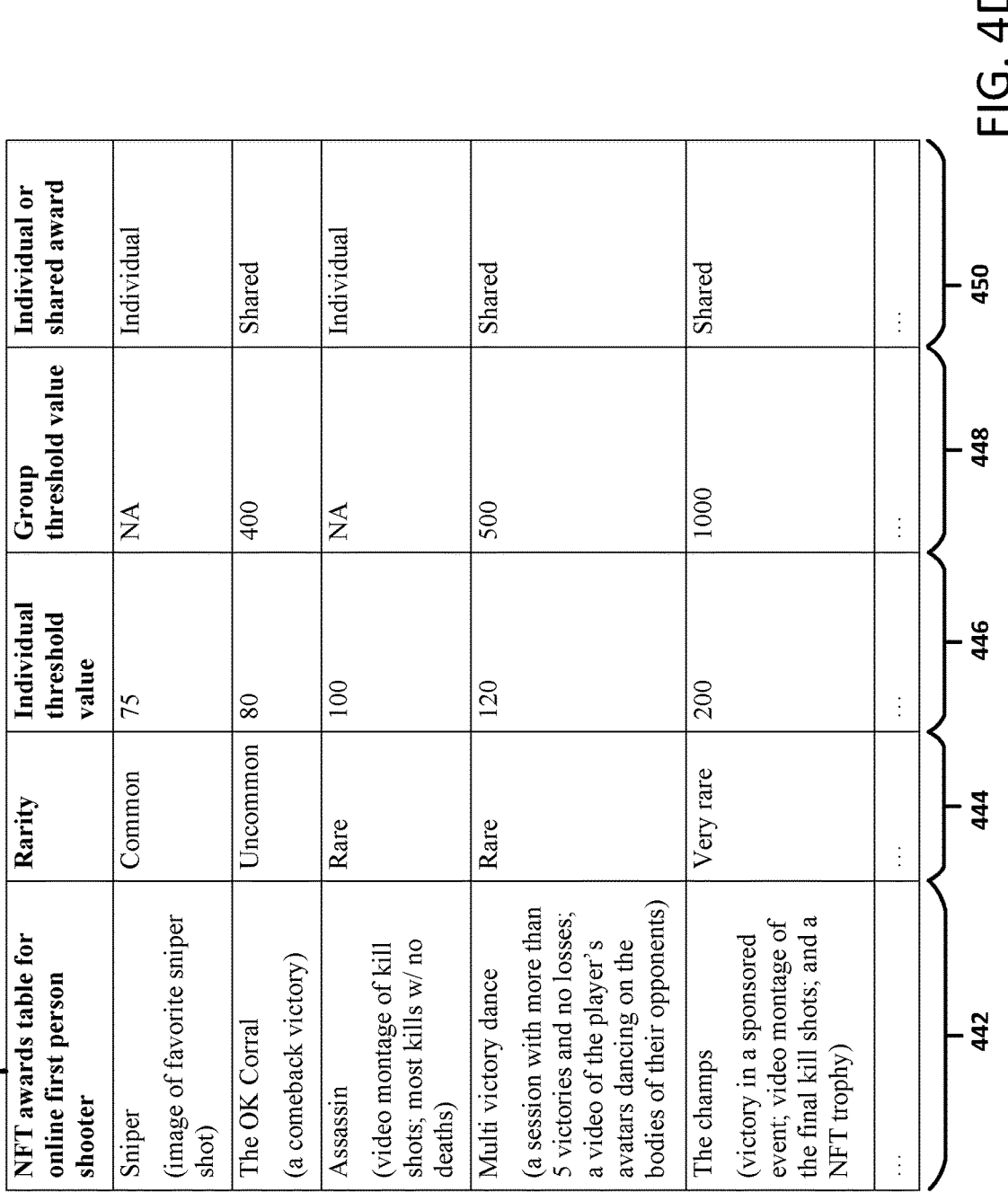

440

| NFT awards table for online first person shooter | Rarity | Individual threshold value | Group threshold value | Individual or shared award |
|---|---|---|---|---|
| Sniper (image of favorite sniper shot) | Common | 75 | NA | Individual |
| The OK Corral (a comeback victory) | Uncommon | 80 | 400 | Shared |
| Assassin (video montage of kill shots; most kills w/ no deaths) | Rare | 100 | NA | Individual |
| Multi victory dance (a session with more than 5 victories and no losses; a video of the player's avatars dancing on the bodies of their opponents) | Rare | 120 | 500 | Shared |
| The champs (victory in a sponsored event; video montage of the final kill shots; and a NFT trophy) | Very rare | 200 | 1000 | Shared |
| ... | ... | ... | ... | ... |

| Viewer personal and device information | Image recognition files | Audio recognition files | NFT wallet(s) | NFT awarding enabled? SNFT awarding eligible? NFT awards earned. | Engagement scoring available? Current engagement score |
|---|---|---|---|---|---|
| • Sammy Sunshine<br>• Age: 42<br>• Sex: M<br>• Location: (geo coordinates)<br>• SS device 1 (ID) SS device 2 (ID)<br>• … | • SSImage file 1<br>• SSImage file 2<br>• SSVideo file 1<br>• … | • SSAudio file 1<br>• SSAudio file 2<br>• … | • SSNFTw1<br>• SSNFTw2 | NFT award Enabled<br>SNFT award eligible<br>• NFT 1<br>• NFT 17<br>• …<br>• MS NFT 1:0.1<br>• MS NFT 2:0.3<br>• … | Scoring Enabled<br>Engagement score: 175 |
| • Mike McMac<br>• Age<br>• Sex<br>• Location<br>• …<br>• MM device n | • MMImage file 1<br>• …<br>• MMImage file n<br>• MMVideo file 1<br>• … | • Empty set | • MMNFTw1<br>• …<br>• MMNFTwn | NFTEnabled<br>SNFTineligible<br>• NFT 17<br>• NFT 18<br>• … | Scoring Enabled<br>Engagement Score: 0 |
| • … | • … | • … | • … | … | … |
| • Empty set<br>• …<br>• Device xxx | • Image file xxx1<br>• Image file xxx2<br>• … | • -<br>• … | • -<br>• … | Not enabled | Enabled |
| • … | • … | • … | • … | … | … |

SYSTEMS AND METHODS FOR GENERATING AND DISTRIBUTING NFTs BASED ON USER INTERACTION

BACKGROUND

Non-fungible tokens (NFTs) have popularized the idea of collecting digital memorabilia. The growing popularity of collecting NFTs coupled with the technical benefits of tracking ownership of a digital piece of media provides new ways for one or more people to digitally memorialize cherished experiences.

SUMMARY

The following summary presents a simplified summary of certain features. The summary is not an extensive overview and is not intended to identify key or critical elements.

Methods are described for creating, sending, and/or sharing a NFT among a group based on attention and interaction of members of the group with content. Attention to the content may be based on a number of input methods including input methods associated with the device playing the content, other devices belonging to members of the group, and/or nearby devices that may share acquired data. A device may receive various types of data (e.g., image files, audio files, video files, etc.) and determine an engagement for a member of a group based on attentiveness markers such as eye focus on a screen, a body position, a body posture, sounds an individual makes, and/or words an individual says. The device may determine a group engagement based on the engagement of the members of the group. The device may create and/or share different NFTs associated with the content and/or the data used to determine the engagement of the group with the content. The device may determine an owner or controller of a NFT to send and/or assign to. The device may determine the owners or controllers of a multi-signature NFT to send and/or assign to. The device may determine the owners and controllers of a fractional NFT to send and/or assign fractions of the fractional NFT to. The fractionalized NFT may be shared (e.g., ownership and/or NFT recorded, confirmations sent, etc.) among members of the group.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 3A and 3B show examples of groups of participants engaging with content together on devices.

FIGS. 4A through 4E show examples of tables for determining engagement of a participant based on the participant's interaction with content, creating and/or sharing NFTs based on engagement, and tracking details of the participants.

DETAILED DESCRIPTION

Figure 1:
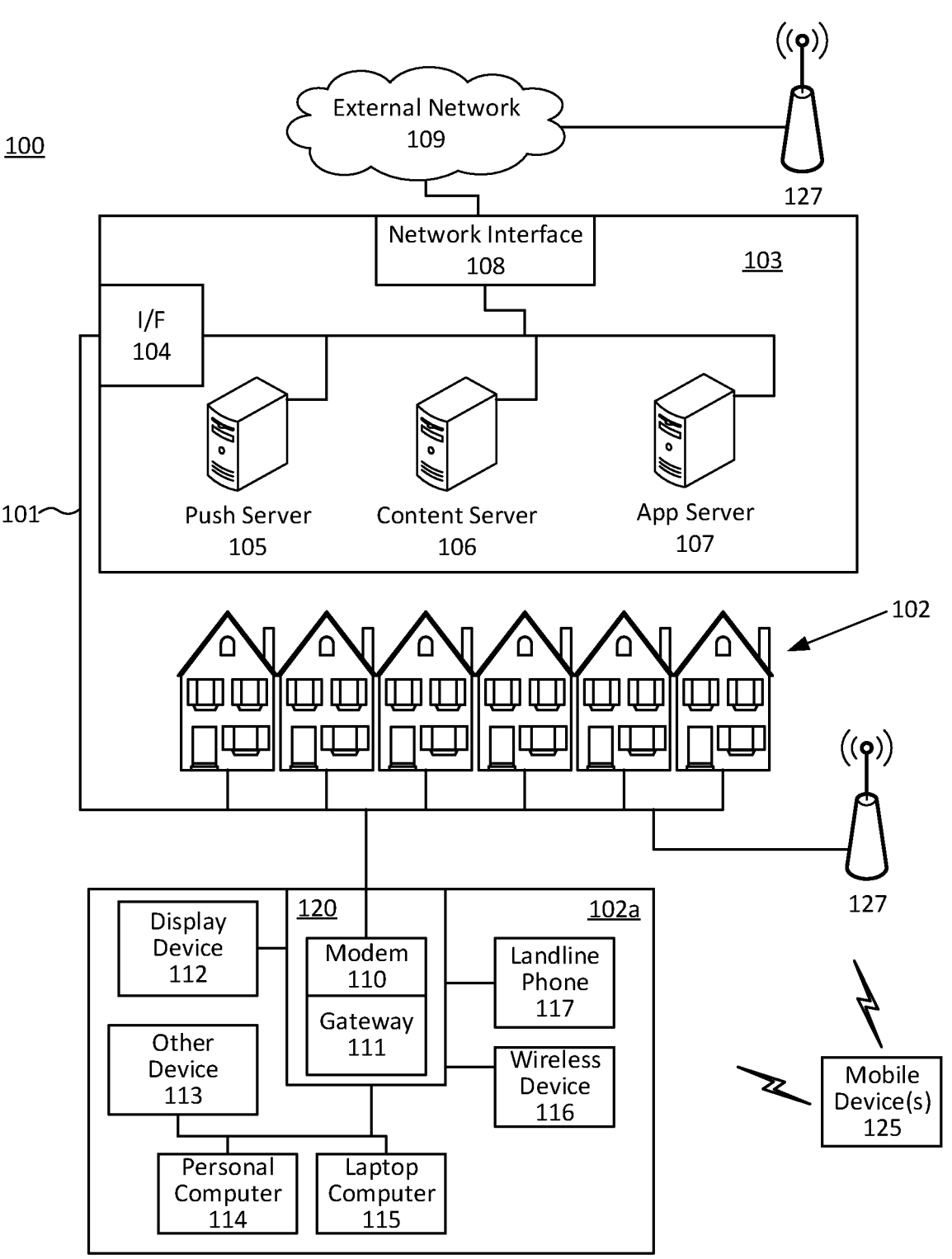
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA)), landline phones 117 (e.g., Voice over Internet Protocol VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
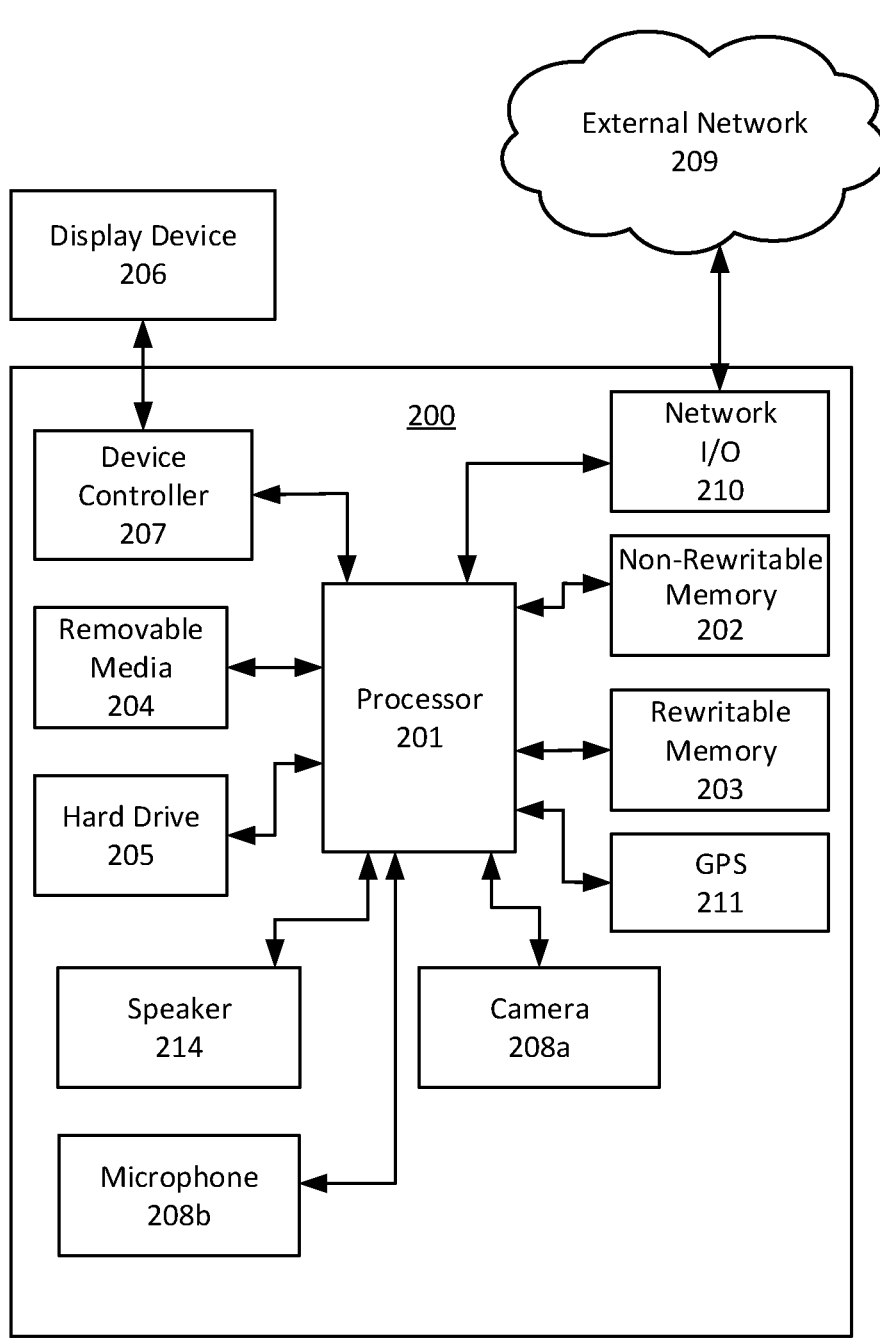
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., mobile phones, tablets, personal computers, gaming consoles, wireless speakers, wearable devices, etc.) The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

FIGS. 3A and 3B show examples of groups of participants engaging with content together on devices. The content may be audio, video, and/or audiovisual content, such as movies, television programs, online games, etc. Participants may be users who view and/or listen to the content, and a participant's engagement may be based on the amount of attention that a participant gives to the content. For example, a user who is avidly staring at a display screen with rapt attention may be considered more engaged with the content being displayed than, for example, a user who is looking at something else in the room and/or engaging in a conversation with someone else. A device (e.g., a television, a computer, a wireless speaker, etc.) may be a device that provides content to one or more participants. One or more separated devices (e.g., a plurality of televisions) may provide content to a group of separated participants in a joint session. Participants may watch the same movie or television show in the same house, but the participants may be in different rooms. Participants may be living in different countries, but the participants may be engaged in watching a movie and/or playing an online game together (e.g., via social media applications, online networking applications, online group sessions, etc.).

Participants may engage in a shared content experience using a variety of devices: a plurality of participants may be able to listen to music together, for example, using one or more wireless speakers; a plurality of participants may be able to watch television programs or movies together, for example, using one or more screens; a plurality of participants may be able to play online games together, for example, using one or more gaming systems; etc.

A device determining engagement of participants may receive audio data from one or more microphones. One or more participants may begin to sing along with a song, for example, if the participants are listening to music together. One or more participants may laugh, for example, if the participants are watching a comedy together. One or more participants may cheer, for example, if the participants are watching a sporting event together. A device determining engagement may include determining that a participant may have laughed, for example, if the device received a sound a person is making at a particular point in a movie, and the device determines that the sound is a laugh. A device determining engagement may determine engagement, for example, if a participant repeats a line from content while the line is being said during the content (e.g., repeating "you can't handle the truth" while watching A Few Good Men as Jack Nicholson says the line). A device may receive a transcript of a content item (e.g., closed-captioning) and perform speech recognition analysis on spoken phrases detected by a microphone. The device may determine that a participant repeated a line from a content item and may increase the speaking participant's determined engagement level (e.g., as described below) for the content item, for example, if the device recognizes phrases that may be within a time threshold of the same phrases in the transcript.

A determination of engagement of participants may comprise receiving video data from one or more cameras. A device may determine that eyes of a participant may be focused on a screen, for example, if the device receives a video file, and the device determines that the eyes are directed towards the screen for a period of time. The engagement may be based on small periods of time. The engagement of each period may be calculated as new engagement data is received. The engagement of each period may be added to the total engagement to calculated a total engagement of the participant. A participant may earn engagement for focusing on a display device, for example, if the device tracks the eyes of a participant and determines that the eyes are directed toward screen for a minimum amount of time. Bodies and/or faces may be directed toward a screen, for example, if the group is watching a television or movie together. A participant may earn engagement, for example, if the posture and/or position of the participant is similar to a predetermined template (e.g., an image of a participant facing a screen). Engagement may be earned, for example, if the participant performs a certain pose while watching content. Participants may begin to dance, for example, if the content is music (e.g., a concert video, music from a wireless speaker, etc.). A device may determine engagement, for example, if a participant performs a certain dance move. A device may determine engagement based facial expressions. A participant may have a look of fear, and a device may determine the look of fear may be engagement, for example, if the group is watching something scary together on a display device. A device may determine engagement based on a participant's actions. A device may determine engagement, for example, if a participant jumps and/or covers their eyes during a frightening moment of the content.

People watching content on a display device 310 (e.g., a television program) may gather to watch a big game or a high profile boxing match. People may watch movies or television together in their homes on the same device or together but separated by feet or miles on multiple devices. FIG. 3A shows an example of a group of participants 340*a* through 340*f* watching content on a display device 310 (e.g., a television). The data used to determine an engagement may be received by the device playing the content, a personal device (e.g., a mobile phone 320, a camera 315, a tablet 325, a wearable device, etc.) of a participant that may receive and/or share, via a gateway 111, data and/or other nearby devices (e.g., a wireless speaker, a microphone 330, web-cams, motion sensors, etc.) that may receive and share, via the gateway 111, data.

Engagement of each participant during a period of time while engaging with content may be determined. A total engagement of each participant throughout the entire time a participant is engaging with the content may be determined. Engagement may be determined for a first participant 340*a* (e.g., participant 1, P1, etc.) through a sixth participant 340*f* (e.g., P6) for focusing on the content on a display device 310 (e.g., a television). Engagement may be determined for focus, for example, by recognizing eyes focused on the content on the display device 310 (e.g., the television).

Engagement may be determined for the first participant 340a through the sixth participant 340f, for example, by comparing the body position of a participant (e.g., the first participant 340a through the sixth participant 340f) to a template of a person watching a screen of a display device 310 (e.g., a television screen) associated with watching the screen with increased attentiveness (e.g., a person facing toward a television screen), and/or the body position of a participant to a template of a person watching the screen of a display device 310 (e.g., a television screen) associated with watching the screen with less attentiveness (e.g., a person facing away from the television, a person facing another person, etc.). Engagement of a participant may be determined (e.g., a first participant 340a, a second participant 340b, etc.) based on facial expressions. Engagement of a participant (e.g., the first participant 340a, the second participant 340b, etc.) may be determined, for example, if a participant 340a through 340f smiles, frowns, and/or shows surprise. Engagement of a participant based on the participant smiling, frowning, and/or showing surprise may be determined, for example, by comparing an image of a participant's face to a template of a smile, a frown, and/or a look of surprise. Engagement of a first participant 340a (e.g., participant 1, P1, etc.) this period may be determined to be 50, for example, if the gaze of the first participant 340a (e.g., participant 1, P1, etc.) is focused on the screen of the display device 310 (e.g., the television screen) and an engagement of 20 is determined, the body posture of the first participant 340a is facing toward the screen of the display device 310 (e.g., the television screen) and an additional engagement of 20 is determined, and the facial expression of the first participant 340a (e.g., participant 1, P1, etc.) is a smile and an additional engagement of 10 is determined. A total engagement of a first participant 340a (e.g., participant 1, P1, etc.) may be determined to be 100, for example, if the first participant 340a (e.g., participant 1, P1, etc.) had a total engagement of 50 at the beginning of this period, and the device determined the engagement of the first participant 340a (e.g., participant 1, P1, etc.) this period is 50. Similarly, the engagement of the second participant 340b (e.g., P2) through the sixth participant 340f (e.g., P6) may be determined to be 50 this period and a total engagement of each of the participants 340b through 340f may be determined to be 100.

An engagement of a group of participants engaging in content may be determined during a period of time, and a total group engagement for all participants, engaging in content over the entire time a group may be engaging with the content, may be determined. An engagement for a group of participants may be determined (e.g., a first participant 340a through a sixth participant 340f) by combining the engagement of the participants 340a through 340f. The group engagement of the first participant 340a (e.g., participant 1, P1) through the sixth participant 340f (e.g., P6) may be determined to be 600, for example, if the device determines the total individual engagement for each of participants 340a through 340f is 100.

A NFT may comprise a digital asset. A NFT may comprise, for example, an audio file, a video file, a uniform resource locator (URL), and/or a volumetric representation (e.g., a static 3D point cloud, a voxel collection, a textured mesh, a signed-distance field (SDF), a neural rediance field (NeRF), a ray bundle, etc.). An NFT may comprise a URL, for example, if the NFT provides access to a video feed of animals in a zoo. An NFT may comprise an image, audio, and/or video of an individual participant. A NFT, associated with a content item, may be sent and/or created based on an engagement of an individual participant. The NFT may be awarded, for example, if the individual engagement of a participant 340a through 340f is greater than a threshold value of the NFT. The NFT may be assigned (e.g., record ownership of NFT, record in NFT, send confirmation, etc.), for example, based on a participant 340a through 340f being registered to receive a NFT. The NFT may not be awarded, for example, based on a participant 340a through 340f not being registered to receive a NFT.

A participant may be awarded an NFT based on their engagement with content. The participant may be awarded an NFT, for example, based on their attention with the content, based on their interaction with the content, and/or based on the amount of time they may be interacting with the content. A participant may be awarded an NFT based on watching content and/or multiple pieces of content for a period of time. The participant may be awarded an NFT, for example, for watching an entire movie and/or for watching a series of movies or television programs. The participant may be awarded an NFT, for example, for viewing content from a particular production company and/or media provider for a minimum period of time. The minimum period of time may be within a time frame. A participant may be awarded an NFT, for example, for watching an entire movie trilogy within a week, within a day, and/or within hours. A participant may be awarded an NFT based on the amount of content that they view. The participant may be awarded an NFT for watching a season of a television show, for watching multiple seasons of a television show, and/or for watching all the episodes of a television show. A participant may be awarded an NFT based on watching content in a particular order. The participant may be awarded an NFT, for example, based on watching content focusing on a particular event and/or individual.

An NFT may be shared among a group. An NFT may be shared by a plurality of owners and/or controllers collectively, or fractions of the NFT may be owned and/or controlled individually. An NFT may be controlled by one or more individuals (e.g., a group), for example, if the NFT is a multi-signature NFT. A multi-signature NFT includes a mechanism that requires multiple signatures for a transaction (e.g., a sale, a transfer of ownership, etc.) to be performed. Each member of a plurality of individuals controlling a multi-signature NFT may have access to the multi-signature NFT and any exclusive experiences (e.g., token gated experiences) the multi-signature NFT may have. Moreover, all the members of the plurality of individuals controlling the multi-signature NFT (e.g., a multi-signature NFT controlling group) may participate in control (e.g., via a voting token, a governance token, etc.) of the multi-signature NFT. Control of the multi-signature NFT may be more transparent, faster, and/or efficient. A signature threshold may be set during creation (e.g., minting) of a multi-signature NFT. The signature threshold sets a number of signatures of the multi-signature NFT controlling group that may be required for a transaction. A signature threshold may require signatures from all members of a multi-signature NFT controlling group. A signature threshold may require a signature from one member of the multi-signature NFT controlling group. Greater protection of control of a multi-signature NFT may be provided, for example, if the signature threshold is greater. Greater convenience in approving a transaction may be provided, for example, if the signature threshold is lower. A signature threshold of a fraction of the total members of the multi-signature NFT controlling group may provide a balance to protection and convenience. The signature threshold of a multi-signature NFT group comprising 5 individuals may be 3 of 5, for example, if the group wanted greater convenience than a 4 of 5 signature threshold, and if the group wanted greater protection than a 2 of 5 signature threshold.

Alternatively, an NFT may be divided into a plurality of NFT fractions, for example, if the NFT is a fractionalized NFT. Each NFT fraction may be controlled by one or more individuals. An NFT fraction may be considered a multi-signature NFT, for example, if the NFT fraction is controlled by more than one individual. Fractionalization of an NFT fractionalized the risk and cost of the NFT. A fractionalized NFT may become unfractionalized, if a single owner acquires all of the fractions. Transaction control of each NFT fraction is controlled by the owner, or owners, of the NFT fraction.

A shared NFT (e.g., a multi-signature NFT, a fractionalized NFT, etc.) may be sent to and/or created for a group of participants 340a through 340f, for example, based on the total engagement of the group of participants 340a through 340f. The shared NFT may be sent to and/or created for a group of participants 340a through 340f, for example, if the total engagement of the group of participants is greater than a shared NFT threshold.

For the case of a multi-signature NFT, ownership and/or control NFT may be sent to, created for, and/or assigned to (e.g., record ownership of NFT, record in NFT, send confirmation, etc.) one or more of the group of participants. A share of the multi-signature NFT may not be sent to and/or created for a participant 340a through 340f, for example, if the participant is not registered to receive a shared NFT. A first participant 340a (e.g., participant 1) may be assigned an ownership and/or control token (e.g., PS1) of 0 and a sixth participant 340f (e.g., participant 6) may be assigned a sixth potential share (e.g., PS6) of 0, for example, if both the first participant 340a and the sixth participant 340f are not registered to receive a multi-signature NFT and/or because the participants are children an may not be permitted to receive a multi-signature NFT.

Alternatively, for the case of a fractionalized NFT, shares of the fractionalized NFT may be sent to, created for, and/or assigned to (e.g., record ownership of NFT, record in NFT, send confirmation, etc.) one or more of the group of participants. A share of the fractionalized NFT may not be sent to and/or created for a participant 340a through 340f, for example, if the participant is not registered to receive a shared NFT. A first participant 340a (e.g., participant 1) may be assigned a first potential share (e.g., PS1) of 0 and a sixth participant 340f (e.g., participant 6) may be assigned a sixth potential share (e.g., PS6) of 0, for example, if both the first participant 340a and the sixth participant 340f are not registered to receive a fractionalized NFT and/or because the participants are children an may not be permitted to receive a fractionalized NFT.

A NFT, based on content a group may be participating with, may be generated. A shared NFT may be generated, for example, based on data received in determining an engagement. The shared NFT may be generated based on an image, a video, and/or audio file of the group. The shared NFT may generated based on an image of participants 340a through 340f, for example, if a device captures the image of the participants 340a through 340f as the shared NFT is awarded.

Shares of a shared NFT (e.g., equal shares for a multi-signature NFT, or fractionalized shares for fractionalized NFT) may be sent, created, and/or assigned (e.g., record ownership of NFT, record in NFT, send confirmation, etc.). The shares of the shared NFT may be sent, created, and/or assigned (e.g., record ownership of NFT, record in NFT, send confirmation, etc.) to a participant 340a through 340f, for example, if the participant 340a through 340f is registered to a shared NFT. The shares of the shared NFT may be sent, created, and/or assigned (e.g., record ownership of NFT, record in NFT, send confirmation, etc.), for example, based on a fraction of the total individual engagement of a participant to a total group engagement of all participants 340a through 340f registered to receive a shared NFT. Shares of a shared NFT may be sent, created, and/or assigned (e.g., record ownership of NFT, record in NFT, send confirmation, etc.) to participant 2 340b (e.g., P2) may be 25%, for example, if participants 2 through 5 340b through 340e are all registered to receive shared NFTs and that each of participants 2 through participant 5 340b through 340e (e.g., PS2 through PS5) has a total individual engagement of 100.

FIG. 3B shows an example of a group of people participating in content using a plurality of devices. Groups of people participating in content may be separated. The groups may be participating in content at different locations. An individual engagement may be determined for each participant of each group. A total group engagement may be determined for each location based on the individual engagements of the participants at that location. A total group engagement for all locations may be determined based on the total group engagement at each location. Multiple NFTs may be sent, created, and/or assigned individually. Shares of a shared NFT be sent, created, and/or assigned to eligible participants at a particular location, and/or shares of a shared NFT may be sent to, created for, and/or assigned to eligible participants at all locations.

Engagement of a participant may be determined. A participant may be determined to have more engagement, for example, if the participant is determined to be cheering at and/or interacting with content in some way. Cheering of a participant may be determined based on comparing images and/or videos of the participant to a database of images and/or videos of people cheering. Also, or alternatively, cheering of a participant may be determined based on comparing audio files of the participant and/or participants to a database of audio files of people cheering. In a first location 350, a first participant 360a (e.g., P1) may earn a higher engagement for cheering. The first participant 360a (e.g., P1) may earn a higher engagement, for example, for cheering by itself (e.g., cheering when watching a game) and/or for cheering at a particular time (e.g., cheering to match what a character in the content is doing). The device may determine the individual engagement for a first participant 360a (e.g., P1) may be 250, for example, if the total engagement of the first participant 360a (e.g., P1) at the beginning of this period was 150, the device determines that the first participant 360a (e.g., P1) is focused on the screen of a display device 310 (e.g., a television screen) and determines an engagement of 25, the device determines that the posture of the first participant 360a (e.g., P1) is toward the screen of a display device 310 (e.g., a television screen) and determines an engagement of 25, and the device determines that the first participant 360a (e.g., P1) is cheering and determines an engagement of 50.

In a first location 350, a second participant 360b (e.g., P2) through a fifth participant 360e (e.g., P5) may each be determined to have an individual engagement of 50 for a period and determined to have a total engagement 100, for example, if each of the participants were determined to be focused on the content on the screen this period and determined to have an engagement of 25, each of the participants were determined to have posture facing the screen of the display device 310 (e.g., the television) this period and determined to have an engagement of 25, and that each of the participants had a total engagement of 50 at the beginning of this period.

Engagement for a participant interacting with content may be determined, for example, if a participant is determined to be posing and/or engaging with the content via motion. In a second location 375, a sixth participant 380*a* (e.g., P6) may be earn a greater engagement for posing. The sixth participant 380*a* (e.g., P6) may be earn a greater engagement, for example, for posing at a particular time (e.g., posing when a character in the content poses). Individual engagement for the sixth participant 380*a* (e.g., P6) may be determined to 250, for example, if the total engagement of the sixth participant 380*a* (e.g., P6) at the beginning of this period was 150, the sixth participant 380*a* (e.g., P6) is posing when a character in the content is posing and an engagement of 100 is determined for the sixth participant 380*a*. Engagement of the remaining members of the group may be determined as described herein in FIG. 3A.

A shared NFT may be sent to and/or created for each group at each location 350 and 375 separately as described herein in FIG. 3A, and/or a device may award a shared NFT to a group comprising a plurality of location (e.g., both the first location 350 and the second location 375). A total group engagement of the group comprising participants of both groups 350 and 375, for NFT eligible participant, may be determined to be 1100 (e.g., 100 each from the second participants 360*b* (e.g., P2) and the fifth participant 360*e* (e.g., P5) from the first location 350, and the eighth participant 380*c* (e.g., P8) through the eleventh participant 380*f* (e.g., P11) from the second location 375, and 250 each from the first participant 360*a* (e.g., P1) and the sixth participant 380*a* (e.g., P6)).

Equal shares may be assigned to a first participant 360*a* (e.g., P1), a second participant 360*b* (e.g., P2), a fifth participant 360*e* (e.g., P5), a sixth participant 380*a* (e.g., P6), an eight participant 380*c* (e.g., P8), a ninth participant 380*d* (e.g., P9), a tenth participant 380*e* (e.g., P10), and an eleventh participant 380*f* (e.g., P11), for example, if the shared NFT is a multi-signature NFT. A potential share of a fractionalized NFT of first participant 360*a* (e.g., P1) and the sixth participant 380*a* (e.g., P6) may each be determined to be 23% and the potential share of the multi-signature NFT of the second participant 360*b* (e.g., P2), the third participant 360*e* (e.g., P3) 360*e*, and the eighth participant 380*c* (e.g., P8) through the eleventh participant 380*f* (e.g., P11) may each be determined to be 9%, for example, if the shared NFT is a fractionalized NFT.

FIGS. 4A through 4E show examples of tables for determining engagement of a participant based on the participant's interaction with content, creating and/or sharing NFTs based on engagement, and tracking details of the participants. FIGS. 4A and 4B show examples of NFT engagement tables. Engagement may be based on attentiveness to the content, interactions with the content, engagement with the content, interactions between members of the group, and/or group engagement with the content. An individual may increase their engagement, for example, by maintaining a minimum amount of focus on the content. An individual may increase their engagement, for example, by laughing or showing fear at certain moments of the content.

A NFT engagement table 400 and 410 may comprise a plurality of columns. A first column of the NFT engagement table 400 and 410 may comprise a name (e.g., a label, etc.) of the engagement 402 and 412. A second column of the NFT engagement table 400 may comprise a description of the engagement 404 and 414. The description of the engagement 404 and 414 may provide requirements for earning engagement. A participant may earn a jump scare engagement of an NFT engagement table 400, for example, if the participant shows an indication of momentary, fear, and/or surprise. A third column of the NFT engagement table 400 may comprise an engagement value of the engagement 406 and 416.

A group's engagement may be the sum of the individual participant's engagement. A group's engagement may increase for a group interaction. One or more participants of a group may all cover their eyes, for example, at a scary moment of a movie. One or more participants of a group may cheer at a particular point in a movie. One or more participants of a group may cheer when their team wins a world series. The rate a group's engagement grows may be based on the participation rate of the group (e.g., little engagement when a few of the group participates, but a lot of engagement when a large number of the group participates).

FIG. 4A shows an example of a NFT engagement table 400 for watching content (e.g., containing scary and/or thrilling content) on screens of display devices (e.g., movies or television). A first column of the NFT engagement table 400 may comprise a name of the engagement 402. Engagement earned for watching a movie may comprise paying attention to the move and/or interacting with the movie. Interacting with the movie may comprise cheering and/or yelling at particular moments in the move (e.g., a character in a movie escapes a dangerous situation). Interacting with the movie may comprising a group gasping and/or showing surprise individually and/or collectively. Interacting with the movie as a viewer and/or a group may comprise doing particular things at particular times. The viewer and/or the group may earn engagement, for example, if the viewer shows fear and/or surprise at a scary moment. Some engagement may be earned based on an engagement of an individual. A player may earn engagement 402 having a value as given by engagement value 406, for example, if the player completes actions based on the description 404. An individual may earn an engagement of 15 for watching a scary movie using a NFT engagement table 400, for example, based on a jump scare engagement 402 having an engagement value 406 of 15, if the individual performs the action(s) based on the description 404. Some engagement may be earned based on engagement by a group. An individual may earn an engagement of 10 for watching a scary movie using NFT engagement table 400, for example, based on a group gasp engagement 402 having an engagement value 406 of 10, if a majority of the group shows surprise at a particular moment.

FIG. 4B shows an example of a NFT engagement table 410 for an online game. A player and/or a group may earn engagement for maintaining attention and/or doing particular things at particular times. The player and/or the group may earn engagement, for example, if the player is able to survive a first person shooter event without being defeated. The player and/or group may earn engagement, for example, if a player is defeated but continue to cheer on their teammates. Engagement awards 412 for an online game may comprise awards associated with the type of game (e.g., kill shots, types of shots, trash talking, etc. for first person shooters). Engagement awards 412 of a NFT engagement table 410 for an online game may award an engagement 416 to individual players and/or to a group of players, for example, if the player and/or group of player perform the acts based on the description 414. A player may receive an engagement of 10, for example, if the player performs the act described in the description 414, the player earns dance on the dead engagement 412 and the dance on the dead engagement value 416 is 10.

FIG. 4C shows an example NFT reward table 420 for watching content on a display device (e.g., a movie or a television program). A NFT award table may comprise threshold values 422a and 422b (e.g., a minimum engagement required to send and/or create a NFT and/or shared NFT). A minimum individual engagement required for a NFT 422a may comprise, for example, a minimum amount of total engagement a participant must earn to have a NFT be sent and/or created. A minimum group engagement required for a shared NFT 422b may comprise, for example, a minimum amount of total group engagement a group of participants must earn to be have a shared NFT be sent and/or created.

A first column of a NFT award table 420 may comprise a NFT name 424 and/or a brief description the NFT. A second column of a NFT award table may comprise a NFT rarity 426. A NFT with a higher rarity may be harder to earn than another NFT, for example, if the NFT with a higher rarity requires greater (e.g., higher) engagement than another NFT with a lower rarity. A NFT may have greater value, for example, if it is rarer. A third column of a NFT award table may comprise a NFT individual threshold value 428. A participant may cause a NFT 424 to be sent and/or created, for example, if the engagement of the participant exceeds a threshold value 428. An individual may earn the super viewer NFT, for example, if the engagement of the individual is greater than 75. An individual may be able to earn multiple individual NFTs. The individual may be able to earn a series of individual NFTs as their individual engagement increases.

A fourth column of a NFT award table may comprise a NFT group threshold score 430. A member of a group may be part of a cause of a shared NFT 424 being sent and/or created, for example, if both a total engagement of the individual is greater than an individual threshold 428 and a total group engagement is greater than a group threshold 430. individual An individual may earn a shared NFT award, for example, if the individual has earned a total engagement greater than some individual threshold score 428, and the group the individual is a member of has earned a total group engagement greater than a corresponding group threshold score 430. An individual of a group may earn the grand party shared NFT, for example, if the total engagement of the individual is greater than 80, there are 10 members of the group, and the total engagement of the group is greater than 1000. The group may be able to earn multiple shared NFTs. The group may be able to earn a series of shared NFTs as the group's engagement increases. The group may first earn a multi watch shared NFT, and later earn a marathon shared NFT, for example, if the total group engagement increases from 500 to 1000.

NFT awards based on watching a movie or television may have awards based on different types of engagement with the content. An award may be given for paying attention. An award may be given for the number of people participating (e.g., a "super" Super Bowl Party that may require at least 10 people). An award may be given for a participant jumping and/or screaming at a scary moment in a movie or repeating famous lines from a movie.

FIG. 4D shows an example NFT award table for participating in an online game. NFTs earned for gaming may be based on interactions of the players in the game environment and/or the interactions of the players over a shared communication channel (e.g., webcams and/or microphones). A first column of a NFT award table may comprise the NFT name 442 and a description of the NFT. A NFT may be based on completing game based events (e.g., defeating a raid boss or beating a top rated first person shooter team), or a NFT may be based on an action the player does outside the game (e.g., repeating a raid bosses dying lines as the boss is defeated, or making a snarky face when an opponent is beat). NFT awards may include audio files of the loudest detected laugh and/or group laugh. NFT awards may include a video file of a person and/or a group (e.g., a montage of the faces when a group beats the raid boss or a montage of the faces when a group wins a first person shooter event). A second column may include a NFT rarity 444. A NFT may have greater requirements and/or may be more difficult to obtain, for example, if the NFT is rarer. A NFT may have greater value, for example, if it is rarer. A third column may comprise a total individual threshold score 446, and a fourth column may comprise a total group threshold score 448. An individual may need to earn a total engagement greater than an individual threshold score 446 to earn a corresponding individual NFT. An individual may need to earn a total engagement greater than an individual threshold score 446, and a group, the individual may be a member of, may need to earn a total group engagement greater than a group threshold score 448 for the individual to be assigned a share of a shared NFT (e.g., equal shares for a multi-signature NFT, fractionalized shares for a fractionalized NFT, etc.).

FIG. 4E shows an example table of participant information. A participant information table may comprise details about participants. The participant information table, for example, may comprise personal details of the participant (e.g., name, age, participant's device information, and/or recognition methods), the eligibility of a participant to earn engagement, the eligibility of a participant to earn NFTs and/or shared NFTs awards, any NFT wallets the participant may have, and/or which NFTs, shared NFTs the participant may have been sent and/or assigned, and/or a current engagement of the participant.

FIGS. 5A through 5F show a flow diagram for determining the engagement of participants of content and sending and/or creating NFTs based on that engagement. The algorithm 500 may be used by a device 200, a gateway 222, a personal computer 114, a smartphone/mobile device 125, or any other desired element described herein. Furthermore, the steps of the algorithm 500 may be divided, and may be performed by different devices as desired.

Figure 5A:
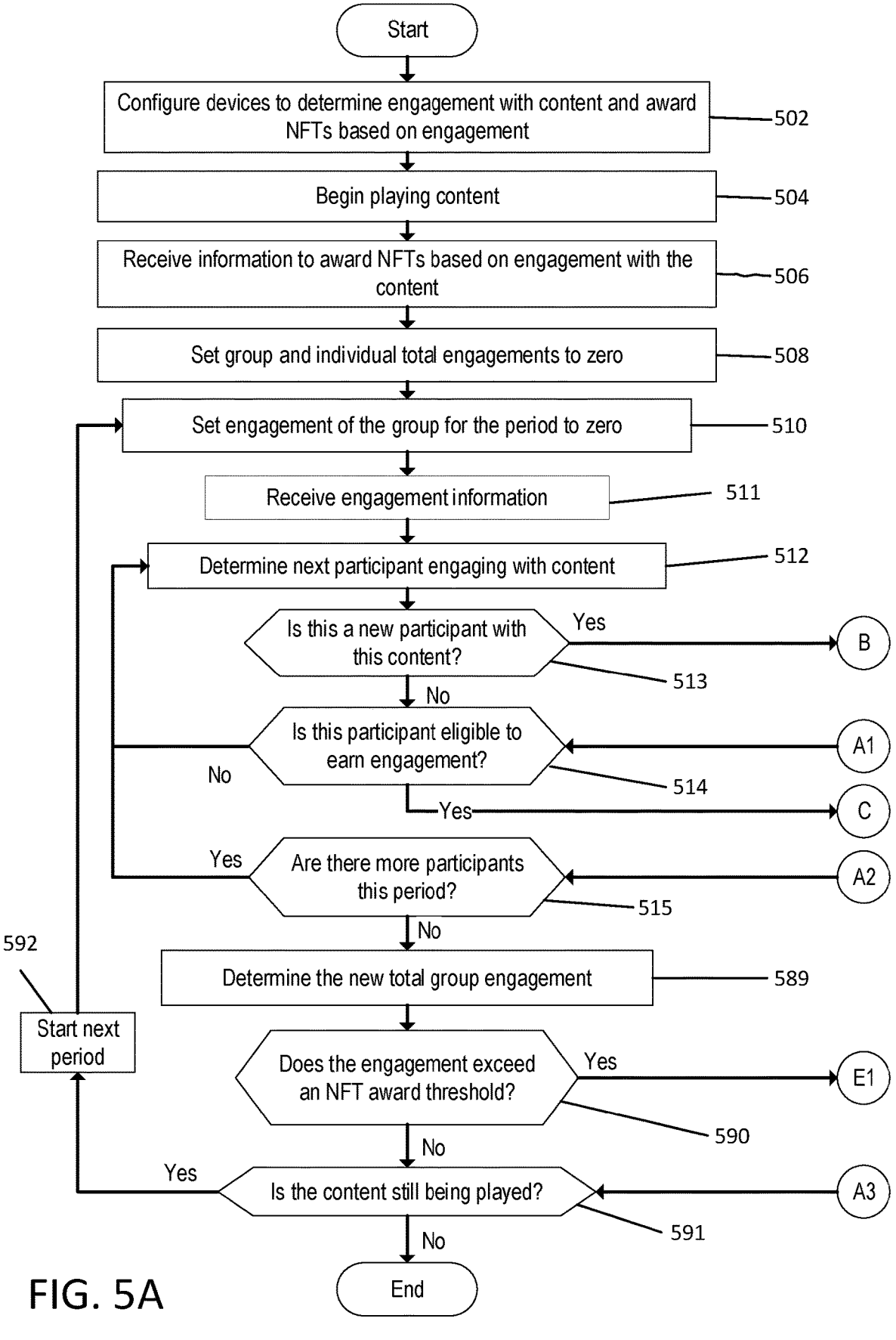
FIGS. 5A through 5F show a flow diagram for determining the engagement of participants of content and sending and/or creating NFTs based on that engagement.

In step 502 of FIG. 5A, a device may be configured to receive details concerning actions of a participant of content, determine a participant's engagement based on the actions, receive information comprising NFT reward tables (e.g., as described herein in FIGS. 4C and 4D) and/or engagement tables (e.g., as described herein in FIGS. 4A and 4B), and/or award NFTs and/or shared NFTs based on the engagement of a participant and/or a group of participants.

In step 504 of FIG. 5A, a group of participants may begin to interact with content playing (e.g., a television program, a movie, a game, music, etc.) on a device (e.g., a display device, a speaker, etc.). A group (e.g., as described herein in FIG. 3A) may begin interacting with a movie, for example, based on the group starting the content. The group may interact with a device that starts the content playing. A group may begin watching a movie, for example, if a member of the group presses play on remote to start playing the movie on a TV. A group may begin listening to music, for example, if a member of the group presses play on a device to start playing the music on a speaker. Groups (e.g., as described herein in FIG. 3B) may begin interacting with content, based on each group starting the content. A first group (e.g., as described herein in FIG. 3B) may begin interacting with content at a first location, for example, if a member of the group presses play on a device to begin playing the content at the first location. A second group (e.g., as described herein in FIG. 3B) may begin interacting with the content at a second location, for example, if a member of the group presses play on a device to begin playing the content at the second location. The first group at the first location and the second group at the second location may begin interacting as group with content, based on both groups playing the content and the first group and the second group agree to become a group. The first group at the first location and the second group at the second location may begin interacting with content as a group, for example, if both groups use a service allows group to interact with content together (e.g., via social media applications, online networking applications, online group sessions, etc.).

In step 506 of FIG. 5A, information may be received to award a NFT based on engagement of a participant and/or a group with the content. The information received may comprise a NFT reward table (e.g., as described herein in FIGS. 4C and 4D) and/or an engagement scoring table (e.g., as described herein in FIGS. 4A and 4B) for the content being played. An engagement scoring table for a movie (e.g., as described herein in FIG. 4A) and/or a NFT reward table for the movie (e.g., as described herein in FIG. 4C) may be received, for example, if a group begins playing the content (e.g., the movie) on a display device. An engagement scoring table for an online game (e.g., as described herein in FIG. 4B) and/or a NFT engagement scoring table for an online game (e.g., as described herein in FIB. 5B) may be received, for example, if a group begins playing the online game. Information on participants may be received. Participant information may comprise NFT wallet information, recognition files (e.g., audio, video, still images, etc.), and/or prior NFT awards.

In step 508 of FIG. 5A, the device may set a total group engagement to zero. The total group engagement may be the total engagement earned by the group from a starting value. Groups viewing content at a plurality of locations (e.g., as described herein in FIG. 3B) may have multiple group engagement scores. A first group at a first location may have a first location group engagement. A second group at a second location may have a second location group engagement. The combined group of the first group and the second group may have a combined group total engagement, for example, if the first group and the second group are interacting with the same content and the first group and the second group formed the combined group (e.g., via social media applications, online networking applications, online group sessions, etc.).

In step 510 of FIG. 5A, a group engagement for a period may be set to zero based on a new period beginning. The group engagement for the period may be set to zero based on the new period beginning, for example, if the group continues to interact with the content. The period may be associated with an instruction cycle of a computer. Each period a device may determine, for example, if any new participants join a group interacting with content, an engagement value for each participant of a group interacting with the content for a period, a total engagement value for each participant, a group engagement value for the period, the total group engagement value, individual NFT awards for each individual, shared NFT awards for the group, and/or if the content is still being played.

In step 511 of FIG. 5A, information for determining engagement of an participant and/or a group may be received. Information may include, for example, image, audio, and/or video files (e.g., as described herein in FIGS. 3A and 3B). An image file may include images of all the participants of a group. The image file may include a different subset of a group of participants, for example, if participants leave and/or enter from period to period. Participants may not arrive on time. Participants may leave early. The information received may be used to determine a history of a participant with current content and/or prior content. A participant may be a new participant and/or a continuing participant of the current content. A participant may have been a participant of a group that engaged in prior content. Current content may be the content currently being played. Prior content may be content played previously (e.g., prior movies watched, prior music listened to, etc.). A group may have watched a movie together before watching the current movie.

In step 512 of FIG. 5A, a participant engaging with content may be determined based on information (e.g., image, video, and/or audio files of a group) received in step 511. A participant of a group may be determined based on the information received. An image of a participant in an image and/or video file may be determined. The participant may be a new participant or alternatively a continuing participant. The participant may be a new participant, for example, if the participant has not been identified in previous periods. The participant may be a continuing participant, for example, if the participant has been identified in previous periods. Identifying may comprise comparing a received information file (e.g., image, audio, and/or video file). A received image file may be compared, for example, to image and/or video files received in previous periods. A received audio file may be compared, for example, to audio files received in previous periods. A participant may be determined to be a new participant or a continuing participant, for example, if the image files, video files, and/or audio files are compared to image files, video files, and/or audio files of continuing participants (e.g., image files, video files, and/or audio files contained in a participant information table as described herein in FIG. 4E). A participant may be determined to be a new participant, for example, if the received image files, video files, and/or audio files are determined not to be associated with a continuing participant. A participant may be determine to be a continuing participant, for example, if the received image files, video files, and/or audio files are determined to be associated with a current participant. A participant may be determined to be a new participant and/or eligible to earn engagement, for example, based on comparing received image files, video files, and/or audio files to stored image files, video files, and/or audio files (e.g., image files, video files, and/or audio files contained in a participant information table as described herein in FIG. 4E). A next participant may be determined to be a new participant or a continuing participant, in step 512 of FIG. 5A, for example, if the participant is determined to be neither a new participant nor eligible to earn engagement. Information received for determining engagement may be used to determine a history of content a participant may have engaged with. The information received may be used to determine, for example, if a participant is a returning participant. A new participant may have engaged in prior content. The participant may be determined to have watched a movie previously, for example, if a group is currently watching a movie.

Information received (e.g., image, video, and/or audio files etc.) may be compared to history files of past content. A participant may be determined to be a returning participant that engaged in former content, in step 516 of FIG. 5B, for example, if the new participant is recognized as a participant that engaged in other, former, content. A participant may be determined to not be a returning participant, for example, if the new participant is not recognized as a participant that engaged in other, former, content. Information of a returning participant may be received from a history file, for example, if the participant is a recognized participant in step 517. Also, or alternatively, information of a non-returning participant may be determined from a participant, for example, if the participant is not a recognized participant in step 517.

Figure 5B:
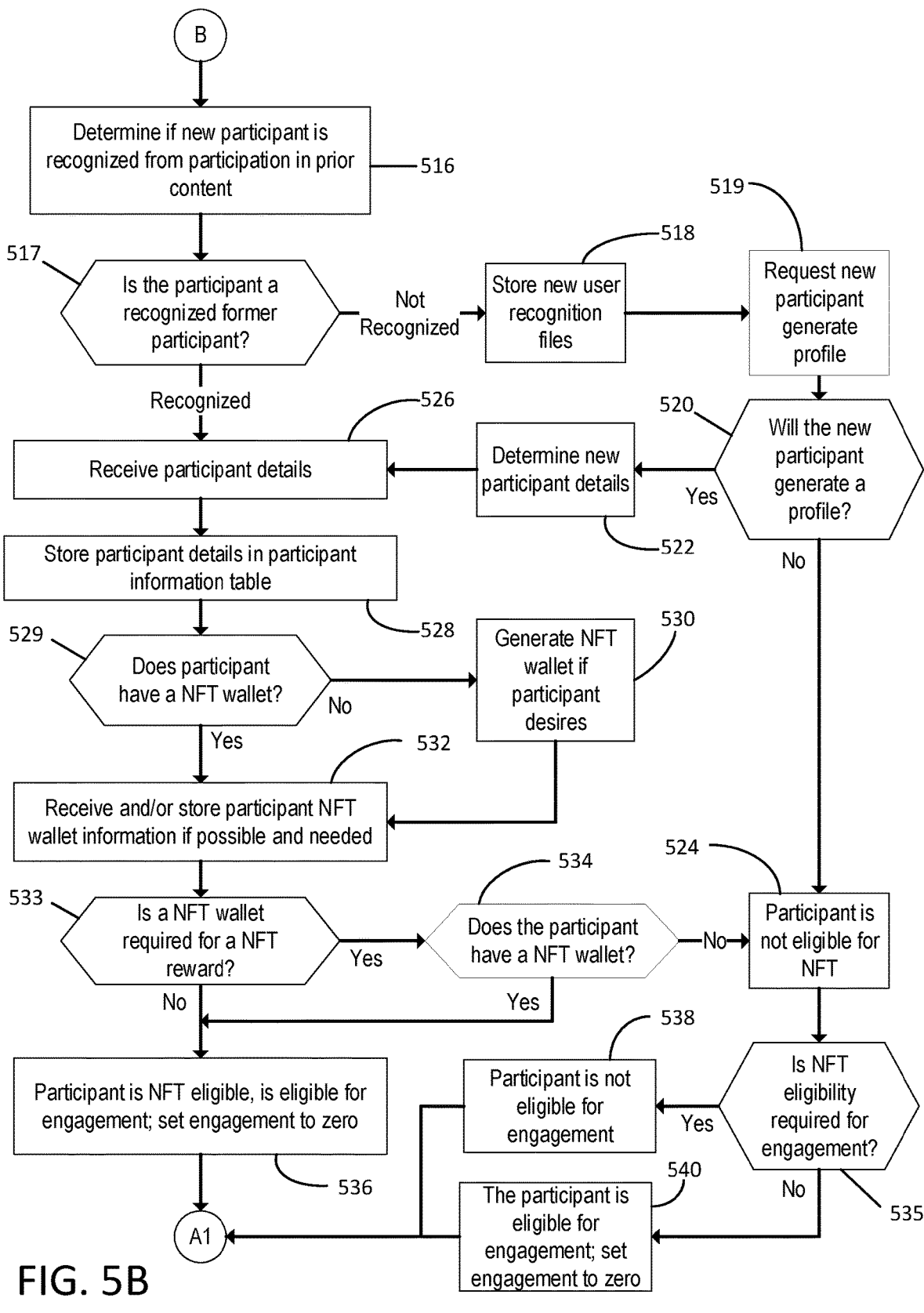

In step 518 of FIG. 5B, audio, video, and/or image files, of a participant may be stored in a participant information table, for recognizing the participant, for example, if a participant is not recognized as a former participant in step 517. A new participant of the present content may need to provide information so that the new participant may be eligible to receive engagement for participating in the current content and/or to receive a NFT award. Information provided may include, for example, a name of the participant, an age of the participant, a location of the participant, and/or devices associated with the participant.

In step 519, a participant may receive a request to create a new participant profile. The participant may or may not agree to create the new participant profile. The new participant may decide to not earn engagement and/or be sent a NFT, for example, if the new participant does not agree to generate a participant profile in step 520. The new participant may decide to earn engagement and/or a NFT, for example, if the new participant agrees to generate a participant profile in step 520.

A new participant may provide participant details, in step 522 of FIG. 5B, for example, if the new participant is willing to generate a participant profile by providing participant information in step 520. The participant details may comprise demographic information (e.g., age, sex, location, etc.) of the participant and/or personal information (e.g., a participant's name, an address, device information, date of birth, etc.). Participant details may include any NFT award program the participant may be enrolled in. Participant details may include recognition files (e.g., image, video, and/or audio files used to recognize a participant). Participant details may be used to suggest further content. Participant details may be used to generate advertising information.

In step 526 of FIG. 5B, participant details may be received from a participant profile generated in step 522, for example, if it was determined in step 520 that the participant agreed to generate a participant profile. Also, or alternatively, in step 526 of FIG. 5B, participant details may be received from a history file of a retuning participant of content, for example, if it was determined in step 517 of FIG. 5B that a participant is a recognized returning participant. A participant may be considered a returning participant, for example, if the participant has generated a participant profile. A participant may be considered a returning participant, for example, if the participant is recognized from recognition files (e.g., image, video, and/or audio files). A history file may comprise identification files (e.g., image, video, and/or audio files) that may be used to document the participants of prior content. A history file may comprise information on prior NFTs earned and/or an NFT wallet, for example, if the returning participant has provided that information in past sessions of engaging with content.

In step 528 of FIG. 5B, participant details received in step 526 may be stored in the current content participant information table (e.g., as described herein in FIG. 4E). Identification files of a returning participant or a new participant that generated a participant profile may be received and/or included in whole or in part to the participant information table.

A NFT wallet may provide a method for a participant to receive, send, and/or trade NFTs. The NFT wallet may comprise a private key to a blockchain for a participant. A NFT wallet information may be received and/or included to a participant information file, history file, and/or a participant profile. In step 529 of FIG. 5B, ownership of a NFT wallet of a participant may be determined. Ownership of a NFT wallet may be determined, for example, based on reviewing a participant profile, a history file, and/or a participant information table. The NFT wallet provides a convenient method for a participant to track NFTs (e.g., NFTs that may have been earned as described herein, NFTs that may have been purchased, etc.).

In step 530 of FIG. 5B, a NFT wallet may be generated for a participant, if it is determined that the participant does not have a NFT walled in step 529. The NFT wallet may be generated, for example, if the participant desires to have a NFT wallet. In step 532 of FIG. 5B, the NFT wallet information may be received and/or stored in a participant information table. The NFT wallet information may be received from the generation of the NFT wallet in step 530, for example, if it was determined that the participant did not have a NFT wallet in step 529 and agreed to having a NFT wallet generated. Alternatively, the NFT wallet information may be received from other files that may have the wallet details (e.g., a participant profile, a history file, and/or a participant information table), for example, if it was determined in step 529 that the participant did have a NFT wallet. Details of the NFT wallet may be stored in a participant information table. A flag in the participant information table may be set based on the participant having or not having a NFT wallet. Certain and/or all NFT awards may require a NFT wallet.

In step 533, a requirement of a NFT wallet to be eligible for a NFT may be determined. To ease awarding NFTs and/or awarding shares of a shared NFT, for example, a NFT wallet may be required.

A participant that does not own a NFT wallet may not be rewarded a NFT, if a NFT wallet is required to earn the NFT. Ownership of a NFT wallet may be determined in step 534. The participant may not be eligible for a NFT, for example, if it was determined in step 533 that ownership of a NFT wallet is required to earn a NFT, and it is determined in step 534 that the participant does not have a NFT wallet. Alternatively, the participant may be eligible for a NFT, for example, if it was determined in step 533 that ownership of a NFT wallet is required to earn a NFT, and it is determined in step 534 that the participant does have a NFT wallet.

A participant may not be eligible for a NFT. The participant may not be eligible for a NFT, for example, if a participant does not have a NFT wallet, as determined in step 534, and a NFT wallet is required to receive a NFT, as determined in step 534. Also, or alternatively, the participant may not be eligible for a NFT, for example, if the participant does not generate a necessary profile, as determined in step 520. In step 524 of FIG. 5B, an indicator (e.g., a flag, a switch, a tag, etc.) indicating that a participant may not be eligible for a NFT may be set. The indicator may be included in a participant information table (e.g., a NFT award enabled indicator as described herein in FIG. 4E).

A participant may still earn engagement, if they are not eligible to be receive a NFT. The participant may earn engagement for a group, but not receive a NFT and/or a shared NFT, for example, if the participant is not eligible to receive a NFT. In step 535, the necessity of a participant to be able to receive a NFT to be able to earn engagement may be determined. A participant may not be able to receive a NFT, but be able to earn engagement. Also, or alternatively, the participant may not be able to receive a NFT, and not be able to earn engagement. An NFT eligibility requirement for earning engagement may be contained in NFT awards table (e.g., as described herein in FIGS. 4C and 4D) and/or a participant information table (e.g., as described herein in FIG. 4E).

In step 538 of FIG. 5B, a participant may be unable to receive a NFT and may not be able to earn engagement. A participant information table (e.g., as described herein in FIG. 4E) may indicate that the participant may not be eligible to earn engagement, for example, if it was determined in step 535, that the participant needs to be eligible to receive a NFT reward to be able to earn engagement. An indicator (e.g., a flag, etc.) in the participant information table may indicate that the participant may not be eligible to earn engagement.

Also, or alternatively, in step 540 of FIG. 5B, a participant may be unable to receive a NFT, but may be able to earn engagement. A participant information table (e.g., as described herein in FIG. 4E) may indicate that the participant may be eligible to earn engagement. The participant information table may indicate that the participant may earn engagement, for example, if, in step 535, it is determined that the participant is eligible to earn engagement.

A participant may be eligible to earn a NFT and earn engagement. In step 536 of FIG. 5B, a participant may be eligible to earn engagement, for example, if the participant is eligible to receive a NFT and it is determined, in step 534, that the participant has a NFT wallet. Alternatively, a participant may be eligible to earn engagement, for example, if the participant is eligible to receive a NFT and it is determined, in step 533, that a NFT wallet is not necessary to earn a NFT. An individual engagement may be stored in a participant information table (e.g., as described herein in FIG. 4E). The individual engagement of a participant, stored in the participant information table, may be set to zero. The score may be set to zero to indicate zero current engagement. In step 536 of step FIG. 5B, details may be stored in the participant information table that indicate the participant may be eligible to receive a NFT, may be eligible to score, and may set the individual engagement to zero.

In step 514 of FIG. 5A, it may be determined if engagement of a participant may be determined or, alternatively, if a next participant may be determined. Engagement of a participant may be determined, for example, if it is determined, in step 536 of FIG. 5B, that a participant is eligible to earn engagement. The next participant may be determined, for example, if it is determined, in step 536, that a participant is not eligible to earn engagement. Engagement of a participant may also be determined, for example, if it is determined, in step 513 of FIG. 5A, that the participant is not a new participant engaged with the content (e.g., the participant was recognized as a current participant using recognition files in a participant information table as described herein in FIG. 5E). In step 512 of FIG. 5A, a next participant may be determined, for example, if it is determined, in step 514, that the current participant is not able to earn engage-ment. Alternatively, the current participant may have their engagement determined, if it is determined, in step 514, that the current participant is able to earn engagement.

Engagement of a participant for a period may be determined, for example, if it determined, in step 514 of FIG. 5A, that a participant is eligible to earn engagement. Engagement of a participant for a period may be determined by setting engagement for the period to zero and determining engagement of a participant. 5A, that a participant is eligible to earn engagement. The total participant engagement for a period may be set to zero in step 541 of FIG. 5C.

Figure 5C:
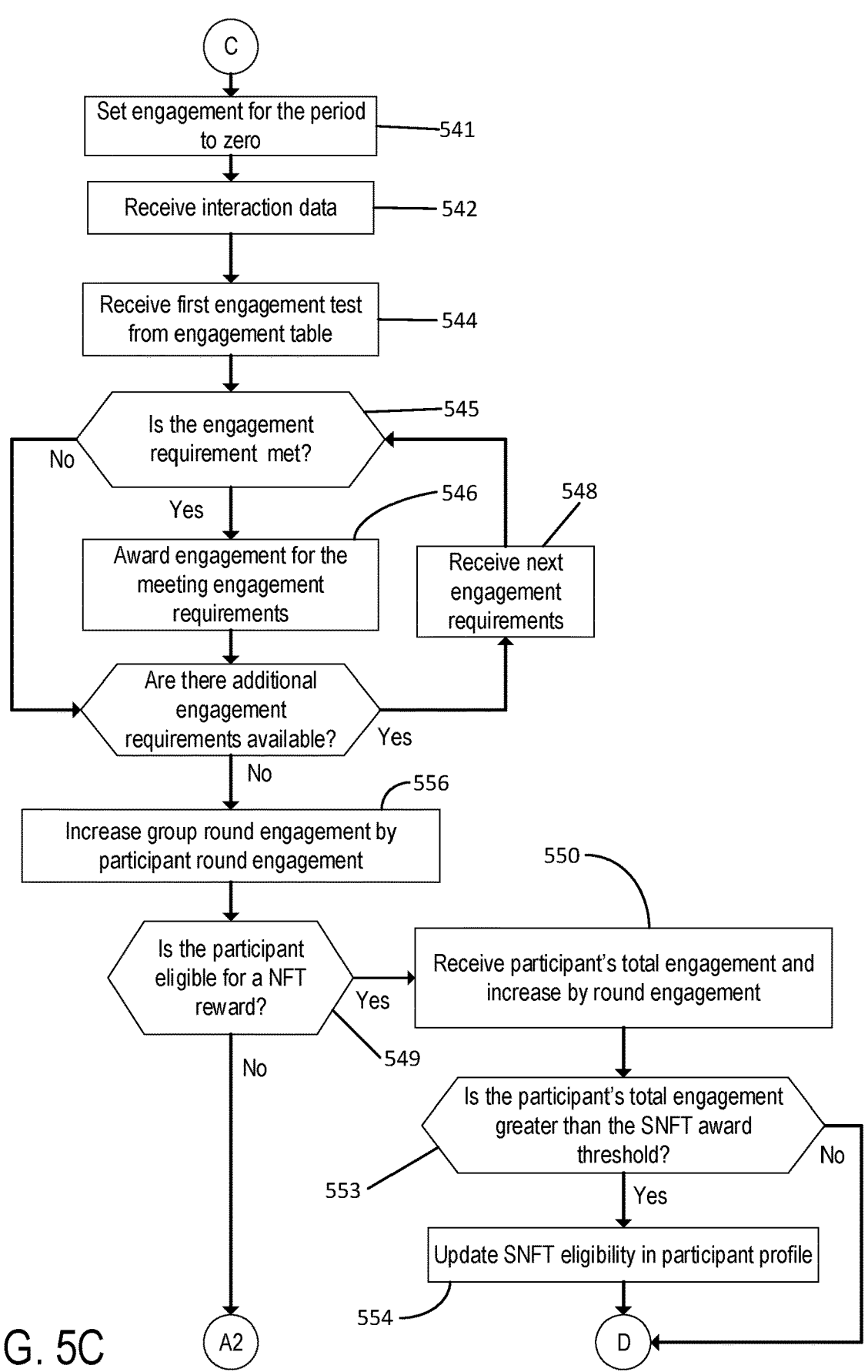

Engagement data may be received in step 542 of FIG. 5C. Engagement data may include, for example, image, video, and audio files. The engagement data may include still images of a group and participants engaging in the content. The images may be frames of a video file. Video and/or audio files may be engagement data. Devices (e.g., cameras 315, mobile phones 320, tablets 325, microphones 330, etc. as described herein in FIGS. 3A and 3B) that may capture images, videos, and/or audio and that may be connected to a gateway 111 may provide engagement data. Engagement data may be compared with image and audio recognition files of a participant information table (e.g., as described herein in FIG. 4E).

Images of a participant in received engagement data may include image files and/or images from a frame of video may be compared to image files stored in a participant information table to determine the participant (e.g., via facial recognition methods.). Actions of the participant from a video file may be compared to engagement requirements and engagement received, for example, if the participant completes the necessary requirements for earning engagement). Received engagement data including audio file may be compared to audio files contained in a participant information table. The audio file may be used to determine if auditory engagement requirements are met (e.g., as described herein in FIGS. 4A and 4B). A participant may earn engagement for cheering, for example, if the participant is recognized as a particular participant watching a movie from engagement data comprising a video file, and if the participant is recognized as cheering from engagement data comprising an audio file.

A first engagement requirement may be determined from the engagement scoring table received in step 506 of FIG. 5A. Engagement scoring tables (e.g., as described herein in FIGS. 4A and 4B) may comprise a number of interactions that may earn engagement. Requirements to earn engagement may be compared to engagement data to determine, for example, if engagement is earned. For each interaction that may earn engagement, the engagement scoring table may comprise a description of the type of engagement and/or models (e.g., templates, patterns, etc.) of the engagement. An interaction that earns engagement for jumping may comprise, for example, a model video of jumping. An interaction that earns engagement for paying attention may comprise, for example, determining the amount of time a participant's eyes are focused on a display device. An interaction that earns engagement for striking a pose may comprise, for example, a model image of the pose and/or a model video of a person striking the pose. The engagement data received in step 542 of FIG. 5C may be compared, for example, to the requirements provided in an engagement scoring table received in step 506. Engagement data received in step 542 may comprise, for example, an video file of a participant engaging with content. The engagement data may be used to determine the participant, and the engagement data may be analyzed to determine, for example, if the requirements for receiving engagement have been completed (e.g., the posture of a participant provided in a received video file may be compared to a posture template received in the engagement scoring table). Similarly, eye focus on a display device received in a video file may be compared to an eye focus requirement listed in the engagement scoring table, for example, for the participant to earn engagement for focusing on the content.

A participant may earn engagement based on comparing received engagement data to an engagement scoring table in step 545 of FIG. 5C. Engagement of a participant may be determined in step 546 of FIG. 5C, and increase the period engagement of the individual participant (e.g., the device may add the engagement earned to participant period engagement), for example, if it is determined that the participant met the requirements for that engagement in step 545. A participant may not earn engagement, for example, if it is determined that the participant did not meet the engagement requirements in step 545. The next engagement requirement may be determined from the engagement table in step 548. The device may determine the next engagement requirement from the engagement table, for example, while the device has engagement requirements remaining to test. The period engagement of the group may be increased by the period engagement of the individual participant in step 556 of FIG. 5C.

An individual participant may or may not be eligible to be sent and/or assigned a NFT in step 549 of FIG. 5C. A participant may be eligible to be sent and/or assigned a NFT reward in step 549, for example, if it was determined, in step 536 of FIG. 5B, that the participant is eligible for NFTs. The participant may not be eligible to be sent and/or assigned a NFT, in step 549 of FIG. 5C, for example, if it was determined, in step 524 of Fib. 5B, that the participant is not eligible for NFTs. The participant may not be eligible for a NFT, for example, if the participant does not have a NFT wallet, as determined in step 534 of FIG. 5B, and if a wallet is required for a NFT, as determined in step 533. The participant may also not be eligible for a NFT, for example, if the participant does not create a participant profile, as determined in step 520.

Total engagement of a participant may be increased by a period engagement of the participant. Current total engagement of a participant may be contained in a participant information table in step 550 of FIG. 5C. The total engagement of the participant may be determined in step 550 of FIG. 5C, for example, if period engagement of the individual participant is added to the current total engagement of the participant. The newly calculated total engagement of the participant may be stored in the participant information table.

In step 553 of FIG. 5C, total engagement of a participant may be compared to a threshold value necessary to earn NFTs. A NFT threshold may be contained in a NFT awards table (e.g., as described herein in FIG. 4C). A NFT threshold may be the minimum engagement necessary to cause a NFT to be sent and/or created. A participant may not be eligible for a NFT in step 553, for example, if the total engagement of a participant is not greater than a multi-signature threshold. A participant may not be eligible for any NFT of FIG. 4C, for example, if the participant does not have a total engagement 75 or greater. A participant may be eligible for a shared NFT in step 553, for example, if the total engagement of a participant is greater than a multi-signature threshold. Shared NFT eligibility may be updated in a participant information table (e.g., as described herein in FIG. 4E) to indicate that a participant may be eligible to be awarded shared NFTs in step 554 of FIG. 5C, for example, if it is determined that the participant is eligible for a shared NFT award in step 553 of FIG. 5C.

A NFT may be created for and/or sent to a participant with an engagement greater than an individual NFT award threshold. In step 560 of FIG. 5D, a first available individual NFT may be determined, and any requirements that may be necessary for the individual NFT to be sent, created, and/or assigned, from a NFT award table received in step 506 of FIG. 5A. The first individual NFT may be the first listed in the NFT award table (e.g., as described herein in FIGS. 4C and 4D).

Figure 5D:
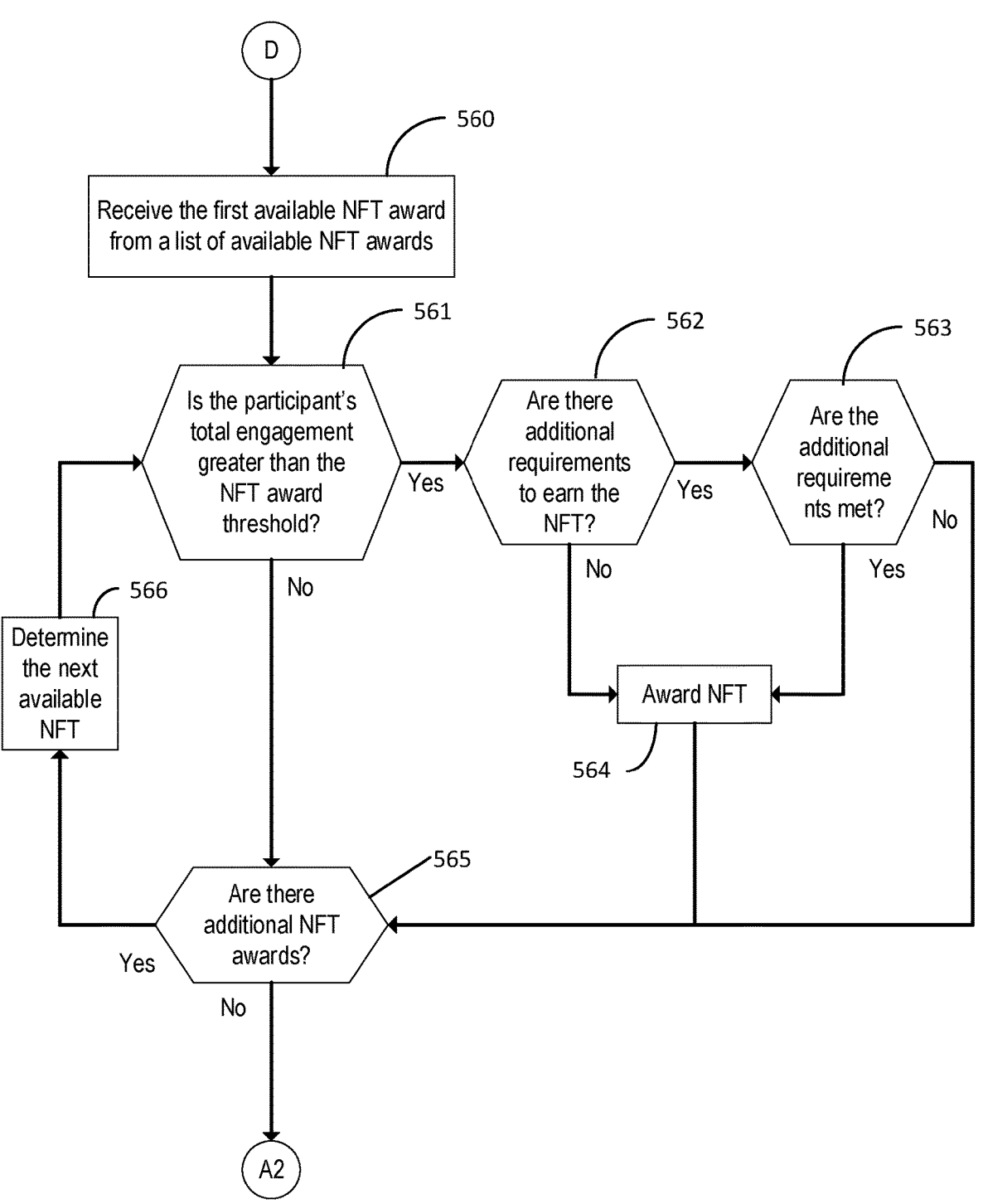

In step 561 of FIG. 5D, total engagement of a participant may be compared to engagement necessary for an individual NFT to be sent to, created for, and/or assigned to the participant. An individual NFT may not be sent to, created for, and/or assigned to the participant, for example, if the individual participant engagement is less than the engagement necessary for the individual NFT to be sent, created, and/or assigned. The total engagement may be determined to be greater than the necessary engagement or not greater than the necessary engagement. Additional requirements may be necessary to earn an individual NFT (e.g., striking a pose at a particular moment to earn a posing individual NFT). Additional requirements may be determined in step 562, for example, if the total engagement of the participant is greater than the engagement necessary for the NFT to be sent, created, and/or assigned, as determined in step 561.

Engagement data of a participant, received in step 542, may be compared to templates of other necessary requirement, that may have been received in step 506, to determine if other necessary requirements for a NFT are met. Video data showing a participant jumping at a scary moment of a movie may be compared to a template of jump scares, for example, if a jump scare NFT may be awarded. NFT awards tables (e.g., as described herein in FIGS. 4C and 4D) may comprise templates of jump scares, for example, if a jump scare is a requirement for a NFT associated with a jump scare.

An individual NFT may be sent to, created for, and/or assigned to a participant in step 564 of FIG. 5D, for example, if the engagement of the participant exceeds an engagement necessary for the individual NFT and it is determined in step 562 that the individual NFT has no additional requirements. An individual NFT may be sent to, created for, and/or assigned to the participant in step 564 of FIG. 5D, for example, if it is determined that the engagement of the participant exceeds the engagement necessary for the individual NFT, in step 561, and it is determined that the participant completed any other necessary requirements (e.g., striking a pose at a particular moment) to earn the individual NFT, in step 563. An individual NFT may not be sent to, created for, and/or assigned to the participant even if it is determined that the engagement exceeds the engagement necessary for the NFT in step 561, for example, if it is determined that the participant did not complete the other necessary requirements for the individual NFT in step 563.

Other NFTs may be available to be sent, created, and/or assigned to a participant. In step 565 of FIG. 5D, it may be determined that additional individual NFTs may be available to be sent, created, and/or assigned. The next available individual NFT and the necessary requirements for the next available individual NFT may be determined in step 566 of FIG. 5D. The individual NFT awards process may continue for each individual NFT award that may exist in a NFT award table (e.g., as described herein in FIG. 4E). Individual NFTs to be sent to, created for, and/or assigned to may be determined for each participant in a group.

Additional participants may earn engagement and/or have individual NFTs sent to, created for, and/or assigned to. In step 515 of FIG. 5A, it may be determined if additional participants may be eligible to earn engagement and/or have individual NFTs sent to, created for, and/or assigned to. By comparing engagement data received in step 511 of FIG. 5A to recognition files of participants (e.g., as described herein in FIG. 4E), for example, it may be determined if additional participants are eligible to earn engagement and/or have individual NFTs sent to, created for, and/or assigned to. A next participant may be determined in step 512, for example, if additional participants are determined to exist. Each participant that appears in engagement data received in step 511 for a period may, systematically, be analyzed to determine, if they may be a new participant engaging in the content, if they may earn engagement, and if they may earn individual NFTs.

Total group engagement may be increased by all individual participant engagement earned in a period. A new total group engagement may be determined, for example, if it is determined in step 515 of FIG. 5A, that there are no more participants this period. In step 589 of FIG. 5A, new total group engagement may be determined by adding all earned individual participant engagement earned in a period to the total group engagement. Alternatively, in step 589, total group engagement may be determined by adding total individual engagement of each participant. Total group engagement may be determined to be 175, for example, if there are two participants of a group where a first participant earned an engagement of 175 and a second participant earned an engagement of 0 (e.g., as described herein in FIG. 4E).

A group may be sent and/or assigned shared NFTs, for example, if it determined that the total group engagement is greater than a shared NFT threshold. Alternatively, a group may continue to earn engagement, for example, until the total group engagement is greater than the threshold, if the content continues to be played.

Equal shares of multi-signature NFTs may be sent to, created for, and/or assigned to members of a group that are eligible to receive a shared NFT. Fractionalized shares (e.g., portions, fractions, etc.) of a fractionalized NFT may be sent to, created for, and/or assigned to participants that may be eligible to receive a shared NFT. A group may be determined to be eligible to be sent and/or assigned a shared NFT, for example, if it is determined, in step 590 of FIG. 5A, that a total group engagement exceeds a shared NFT engagement threshold. Shares of a multi-signature to send and/or assign to one or more group participants eligible to be sent and/or assigned a shared NFT may be determined. Participants that may be eligible to be sent and/or assigned a shared NFT may be determined in step 566 of FIG. 5E. Participants that may be eligible to be sent and/or assigned a shared NFT may be determined, for example, using a participant information table (e.g., as described herein in FIG. 4E). A flag (e.g., a tag, etc.) may exist in the participant information table that may indicate that the participant is eligible to be sent and/or assigned a shared NFT.

Shares of a shared NFT may be sent and/or assigned to participants in a group using a variety of methods. Every participant that earns a minimum engagement may earn an equal share of the multi-signature NFT, for example, if the shared NFT is a multi-signature NFT.

Alternatively, participants may earn a fractional share of a fractional NFT based on the share of engagement the participant earned of the total group engagement, for example, if the shared NFT is a fractional NFT. Participants with a minimum amount of engagement may all vote to determine how to send and/or assign shares of the shared NFT to eligible participants. One or more participants of all the participants may assign shares of the shared NFT to eligible participants.

Shares may be initially be assigned fractionally based on the fractions of total engagement earned by each of the participants. Some participants may earn engagement for a group but may not be eligible for a NFT. Some participants may earn engagement for a group and be eligible for a NFT, but may not have earned enough engagement to be eligible for a shared NFT (e.g., as described herein in FIG. 4E). The fractional share of the fractional NFT that may be earned by the participants ineligible to be sent and/or assigned a shared NFT may be shared among the participants that are eligible to be sent and/or assigned a shared NFT.

Figure 5E:
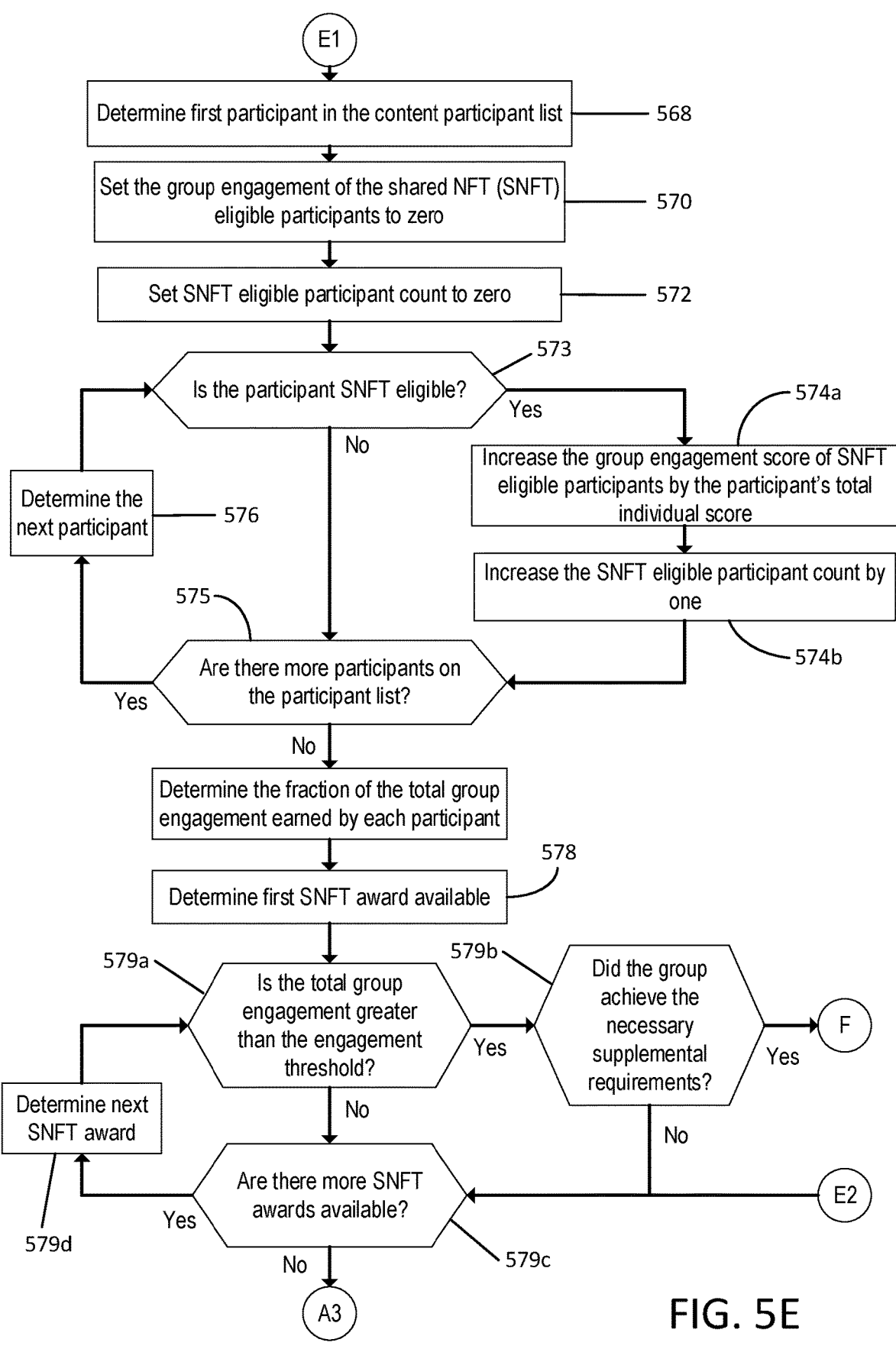

In step 570 of FIG. 5E, a group engagement of shared NFT eligible participants may be set to 0. In step 572, a count of participants eligible to be sent and/or assigned shares of a shared NFT may be set to zero. A participant information table (e.g., as described herein in FIG. 4E) may be reviewed for details relating to shared NFT eligibility.

Participants that may be eligible to be sent and/or assigned a shared NFT may be determined in step 573. For each participant in a participant information table multi-signature eligibility may be determined, for example, based on a flag (e.g., a tag, etc.) indicating that the participant is eligible for a shared NFT. The participant may either be eligible for a shared NFT or not eligible for a shared NFT. The participant information table may indicate the participant may be eligible to be sent and/or assigned a shared NFT, for example, if it is determined in step 553 of FIG. 5C that the individual engagement of a participant exceeds the shared NFT threshold, and the participant information table in step 554 of FIG. 5C is updated, so that the participant is eligible to be sent and/or assigned a shared NFT.

A group engagement of multi-signature eligible participants may be increased by the individual participant engagement in step 574a and a count of eligible shared NFT participants by 1 in step 574b, for example, if it was determined, in step 573, that the participant is eligible to be sent and/or assigned a shared NFT. Eligibility to be sent and/or assigned a shared NFT may be determined for each member of a group.

A total group engagement of multi-signature eligible participants, and a total number of shared NFT eligible participants may be determined by analyzing all participants in a participant information table. The next participant to determine for eligibility may be determined in step 576, for example, if a participant information table contains additional participants that have not been analyzed for multi-signature eligibility. For each participant in a participant information table, it may be determined, for example, if the participant is eligible for a shared NFT, and if the participant is eligible for a shared NFT, the total group engagement of shared NFT eligible participants may be increased by the individual engagement of the participant, and the count of multi-signature participants increased by 1. The device may send and/or assign shares of a shared NFT (e.g., equal shares for a multi-signature NFT, fractional shares for a fractional NFT, etc.) to participants eligible to receive the shared NFT, after determining there are no further participants in step 575.

For each participant eligible to be sent and/or assigned a shared NFT, a ratio of the individual group engagement for the participant to the total engagement of all the shared NFT eligible participants may be stored (e.g., the fraction of the participant's contribution to the total group engagement may be stored in a participant information table as described herein in FIG. 4E). A particular participant eligible to earn a shared NFT may have a detail in the participant information table identifying a shared NFT earned and a share of 0.1 (e.g., MS NFT 1:0.1 as described herein in FIG. 4E), for example, if the particular participant earned ten percent of the total engagement earned by shared NFT eligible participants.

shared NFTs that may be awarded and/or may be assigned (e.g., recorded ownership of NFT, recorded in NFT, sent confirmation, etc.) may be determined based on comparing the total group engagement to a shared NFT threshold contained in a NFT awards table. In step 578 of FIG. 5E, a first shared NFT from a NFT may be determined from a NFT awards table (e.g., as described herein in FIGS. 4A and 4B). In step 579a of FIG. 5E, it may be determined if the total group engagement may or may not be greater than a shared NFT award threshold. In step 579b of FIG. 5E, it may be determined if a group achieved any other supplemental requirements (e.g., every participant showing surprise at the same time) that may be necessary to earn the shared NFT, for example, if it is determined that the group engagement threshold was met in step 579a of FIG. 5E.

Shares of shared NFTs (e.g., equal shares for a multi-signature NFT, fractional shares for a fractional NFT, etc.) may be awarded and/or may be assigned (e.g., record ownership of NFT, record in NFT, send confirmation, etc.) to an individual shared NFT eligible participant equally (e.g., a multi-signature NFT) or based on a fraction of a total engagement of all shared NFT eligible participants earned by the shared NFT eligible participant (e.g., a fractional NFT). A shared NFT award may be minted and/or generated, in step 580 of FIG. 5F, for example, if it was determined that the total group engagement exceeded a threshold value and/or if the group achieved any other necessary requirements in step 579b of FIG. 5E. The shared NFT may be minted and/or generated based on a NFT awards table. The shared NFT generated may be based on content being viewed (e.g., video, images, and/or audio clips from the content being played and/or footage only available for NFT generation, etc.) and/or received data (e.g., video and/or audio files of the group, screen grabs associated with particular portions of content, etc.) used for determining engagement.

Figure 5F:
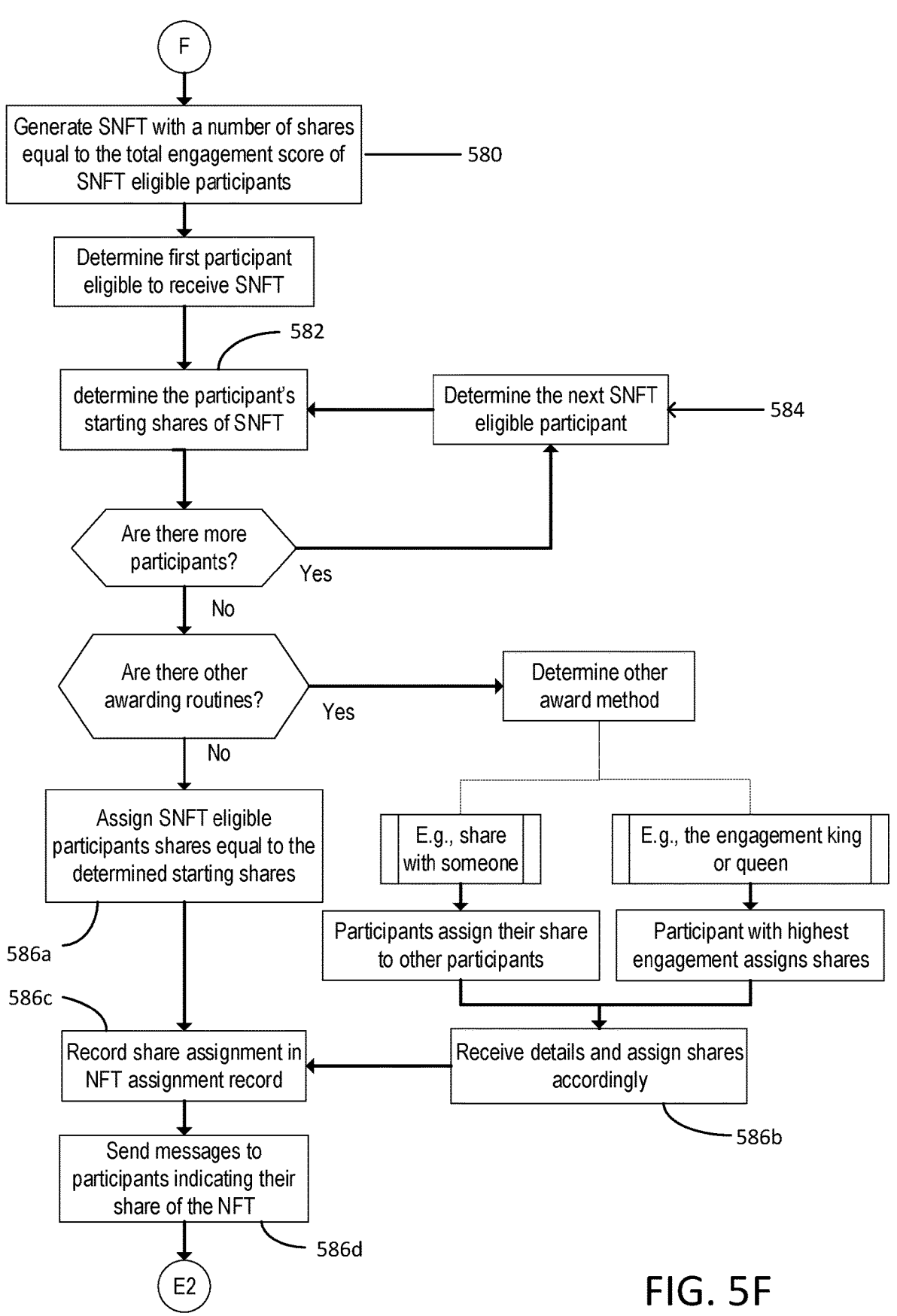

A generated shared NFT, in step 580 of FIG. 5F, may be assigned a number of shares equal to a total group engagement of shared NFT eligible participants. For each shared NFT eligible participant, an equal number of shares of the generated shared NFT may be assigned, for example, if the shared NFT is a multi-signature NFT.

Alternatively, for each shared NFT eligible participant, a starting number of shares of the generated shared NFT may be apportioned, in step 582 of FIG. 5F, based on the individual engagement of the participant if the shared NFT is a fractional NFT. The number of shares that may be apportioned may be equal to the individual engagement of a participant, for example, if the apportionment is based on the fraction of the total group engagement earned by the participant. Alternatively, the shares of a shared NFT may be apportioned to participants eligible to earn the shared NFT equally, like a multi-signature NFT, regardless of the share of the total group engagement earned by each of the participants. A quarter of the shares of a fractional NFT may be apportioned equally to four participants, for example, if the four participants are determined to be eligible to earn a share of a multi-signature regardless of the engagement each participant earned. The shares of the shared NFT may be apportioned, to participants eligible to earn multi-signature, based on other methods that may be stored in NFT awards tables.

A generated fractional NFT may be apportioned to participants of a group eligible to be sent and/or assigned the fractional NFT based on methods other than a fractional earned method (e.g., fractions of ownership is based on the fraction of engagement earned). The generated shared NFT may be apportioned based on input from the shared NFT eligible participants. A query may be sent to participants that may have been apportioned shares of the shared NFT. The query may be a message on a screen displaying the content. The query may be messages sent to devices owned and/or used by the participants. The message may ask a participant if they would like to give a portion of their shares to another participant. The message may inform the participant to point to and/or indicate in another way (e.g., a hug, finger bunny ears behind the head, etc.) the other participant to assign the portion of the shares.

A generated fractional NFT may be apportioned based on decisions of participants with a highest fractional amount of a total group engagement. The participants with the highest fractional amounts of the total group engagement may have messages sent to their devices. The message may comprise a list of participants eligible to earn the fractional NFT and/or the amount of shares the participants with the highest fractional amount of the total group engagement may assign.

Shares of shared NFTs (e.g., equal shares for a NFT, fractional shares for a fractional NFT, etc.) may be assigned (e.g., record ownership of NFT, record in NFT, send confirmation, etc.), in steps 586a-d of FIG. 5F. Assignment may comprise sending a message to a bookkeeper maintaining a record of ownership, and/or assignment may comprise creating a blockchain that hosts the NFT.

Shared NFTs are assets that are owned collectively. Managing a fraction of fractional NFT is controlled by the owner of the fraction of the fractional NFT. Storing and/or managing a multi-signature NFT requires signatures and/or approvals from each participant that may own a share of the multi-signature NFT. A ledger in the NFT blockchain may comprise the members of the multi-signature NFT and/or their equal share of the multi-signature NFT. Sale and/or ownership transfer of a multi-signature NFT requires approval from a predetermined number of owners and/or controllers of the multi-signature NFT. Assignment rights may be limited to approval by all shares (e.g., every shareholder must approve of the assignment).

The assigned shares of a fractional NFT may be later sold and/or given to other individuals. The other individuals may be other group participants and/or individual that were not group participants. Assignment rights of a participant's share may not require approval from other shareholders for a fractional NFT.

Shares of shared NFTs (e.g., equal shares for multi-signature NFTs, fractional shares for fractional NFTs, etc.) may continue to be awarded and/or assigned (e.g., record ownership of NFT, record in NFT, send confirmation, etc.), while shared NFTs are available to award and/or assign (e.g., record ownership of NFT, record in NFT, send confirmation, etc.). It may be determined if there are additional shared NFTs available in step 579c of FIG. 5E, if the device determined, in step 579a of FIG. 5E, that a group engagement did not exceed a shared NFT threshold, or alternatively, if it was determined, in step 579b of FIG. 5E, that a group did not achieve any necessary additional requirements to earn the shared NFT, and/or alternatively if in steps 586*a-d* a shared NFT was sent, created, and/or assigned (e.g., recorded ownership of NFT, recorded in NFT, sent confirmation, etc.). The next available shared NFT may be determined in step 579*d* in FIG. 5E, for example, if it was determined, in step 579*c* of FIG. 5E, determined that additional shared NFTs were available. Engagement of individual participants and/or of the group may continue to be determined, for example, if it is determined, in step 579*c* of FIG. 5E, that no additional shared NFTs are available.

Individual participant engagement and/or group engagement may be continually determined while content may be continuing to play. The content may or may not continue to play, for example, if it is determined that a group is not yet eligible to be sent and/or assigned a shared NFT, or if it is determined in step 579 of FIG. 5E that there are no more shared NFTs available to a group in a period. Individual participant engagement and/or group engagement may continue to be determined, for example, if it is determined in step 591 of FIG. 5A that content is still being played. Individual participant and/or group engagement may continue to be determined by starting a new period in step 592 of FIG. 5A. Last period engagement may be set to zero, for example, by resetting the group period engagement to zero in step 510 of FIG. 5A and proceeding with the steps described herein for FIGS. 5A through 5F. The determination of individual participant and/or group engagement may end, for example, if it is determined in step 591 of FIG. 5A that the content is no longer being played.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   receiving, by a computing device, information identifying physical activities of a plurality of participants in a group session involving a content item;
   generating, based on the information and for the plurality of participants, a non-fungible token (NFT)—that indicates ownership of the NFT, wherein a first participant is assigned a greater amount of the ownership than a second participant based on determining that the information indicates that the first participant consumed a longer duration of the content item than the second participant; and
   sending the NFT to one or more user devices associated with the participants.

2. The method of claim 1, wherein the ownership of the NET is distributed by:
   distributing ownership of the NET based on a voting share assigned to each participant of the group session.

3. The method of claim 1, wherein the determining that the information indicates that the first participant consumed a longer duration of the content item than the second participant comprises determining that eyes of the first participant were directed to the content item for a longer duration than eyes of the second participant.

4. The method of claim 1, wherein the determining that the information indicates that the first participant consumed a longer duration of the content item than the second participant comprises determining that body movement of the first participant corresponded to more attention to the content item than body movement of the second participant.

5. The method of claim 1, wherein the determining that the information indicates that the first participant consumed a longer duration of the content item than the second participant is based on one or more facial expressions of the first participant.

6. The method of claim 1, wherein the determining that the information indicates that the first participant consumed a longer duration of the content item than the second participant is based on one or more sounds made by the first participant.

7. The method of claim 1, wherein the generated NFT comprises a video file of one or more of the plurality of participants.

8. The method of claim 1, wherein the generated NFT comprises an audio file of one or more of the plurality of participants.

9. The method of claim 1, wherein the generated NFT comprises a volumetric representation of one or more of the plurality of participants.

10. The method of claim 1, wherein the generated NFT comprises a uniform resource locator (URL).

11. A method comprising:
   determining engagement based on physical activities of a plurality of participants with content during a group session
   generating, based on the engagement and for the plurality of participants, one or more NFTs, wherein a first participant is assigned a greater amount of ownership of the one or more NFTs than a second participant based on determining that the first participant consumed a longer duration of the content than the second participant; and
   sending one or more messages indicating partial ownership, by the plurality of participants, of the one or more NFTs, wherein the one or more messages comprise: an indication of partial ownership of the one or more NFTs and partial ownership shares of the one or more NFTs.

12. The method of claim 11, wherein the determining that the first participant consumed a longer duration of the content than the second participant comprises determining that eyes of the first participant were directed to the content for a longer duration than eyes of the second participant.

13. The method of claim 11, wherein the determining that the first participant consumed a longer duration of the content than the second participant comprises determining that body movement of the first participant corresponded to more attention to the content than body movement of the second participant.

14. The method of claim 11, wherein the determining that the first participant consumed a longer duration of the content than the second participant is based on one or more facial expressions of the first participant.

15. The method of claim 11, further comprising:
   storing a video file comprising one or more of the plurality of participants, and wherein the one or more participants were awarded engagement; and
   generating a new NFT comprising the video file.

16. The method of claim 11, further comprising:
   storing a table of NFT sharing functions, wherein the NFT sharing functions are based on the engagement of one or more of the plurality of participants and aggregate engagement of the one or more participants, and wherein the partial ownership is based on the NFT sharing functions.

17. A method comprising:

creating a blockchain that hosts an NFT, wherein the blockchain indicates shared ownership of the NFT, and wherein the shared ownership indicates that a first participant of a plurality of participants of a group session is provided a greater amount of ownership of the NFT compared to a second participant of the plurality of participants based on a determination that, during the group session, one or more physical activities of the first participant during the group session indicated that the first participant consumed a longer duration of a content item compared to the second participant;

sending one or more messages indicating shared ownership, of the NFT, by the plurality of participants in the group session;

storing a record of the shared ownership and an amount of ownership of the plurality of participants in a shared ownership record; and sending, to a device of one of the plurality of participants, a message indicating the shared ownership and an amount of ownership of the NFT corresponding to the one of the plurality of participants.

18. The method of claim 17, wherein the determination that the one or more physical activities of the first participant during the group session indicated that the first participant consumed the longer duration of the content item compared to the second participant comprises determining that eyes of the first participant were directed to the content item for a longer duration than eyes of the second participant.

19. The method of claim 17, wherein the determination that the one or more physical activities of the first participant during the group session indicated that the first participant consumed the longer duration of the content item compared to the second participant comprises determining that body movement of the first participant corresponded to more attention to the content item than body movement of the second participant.

20. The method of claim 17, wherein the determination that the one or more physical activities of the first participant during the group session indicated that the first participant consumed the longer duration of the content item compared to the second participant is based on one or more facial expressions of the first participant.

* * * * *